May 16, 1933.　　　　　J. F. GAIL　　　　　1,908,972
QUILTING MACHINE
Filed Sept. 21, 1928　　　18 Sheets-Sheet 1

Inventor:
John F. Gail
By Fisher, Clapp, Soans + Pond Attys

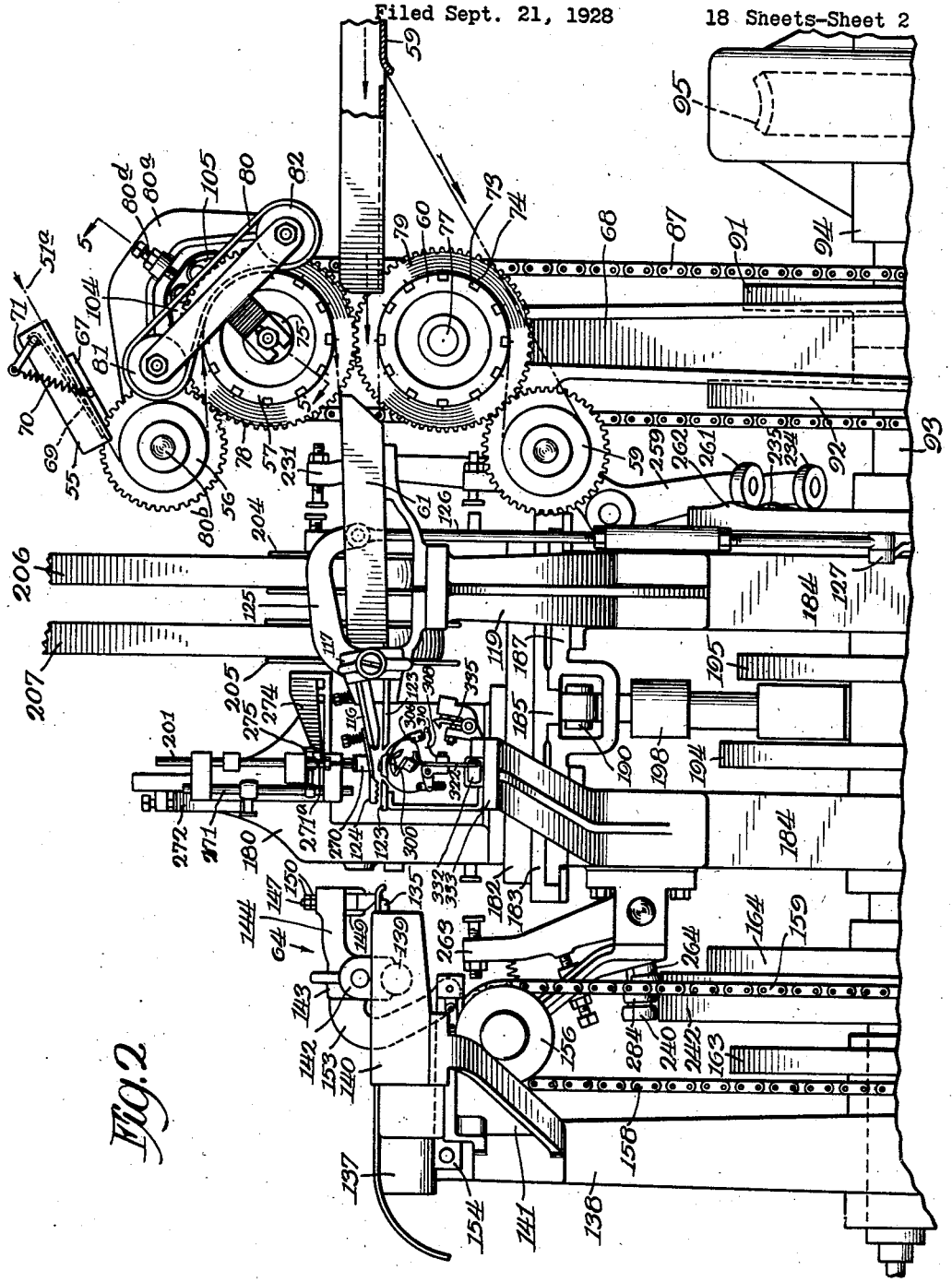

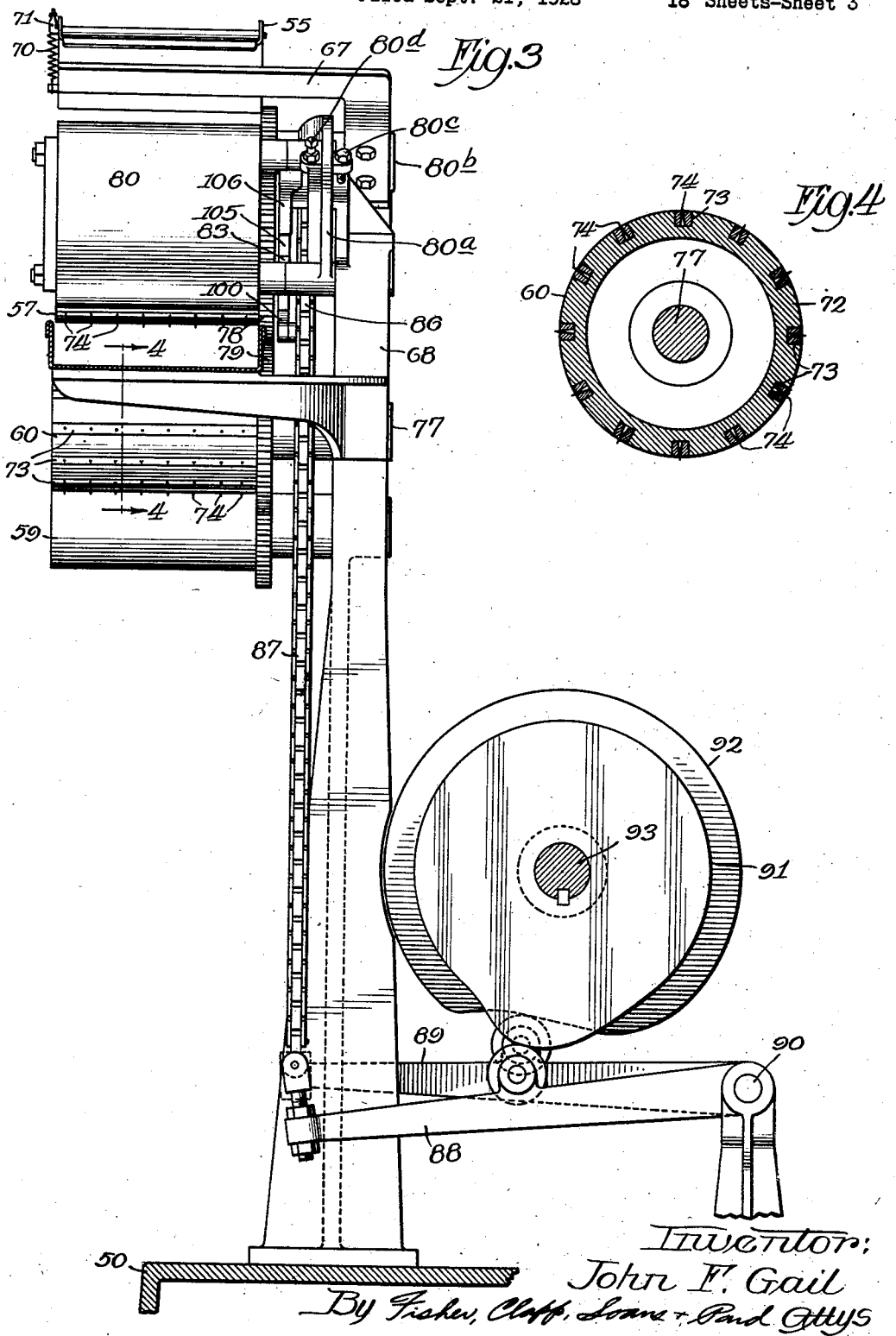

May 16, 1933.　　　J. F. GAIL　　　1,908,972

QUILTING MACHINE

Filed Sept. 21, 1928　　18 Sheets-Sheet 4

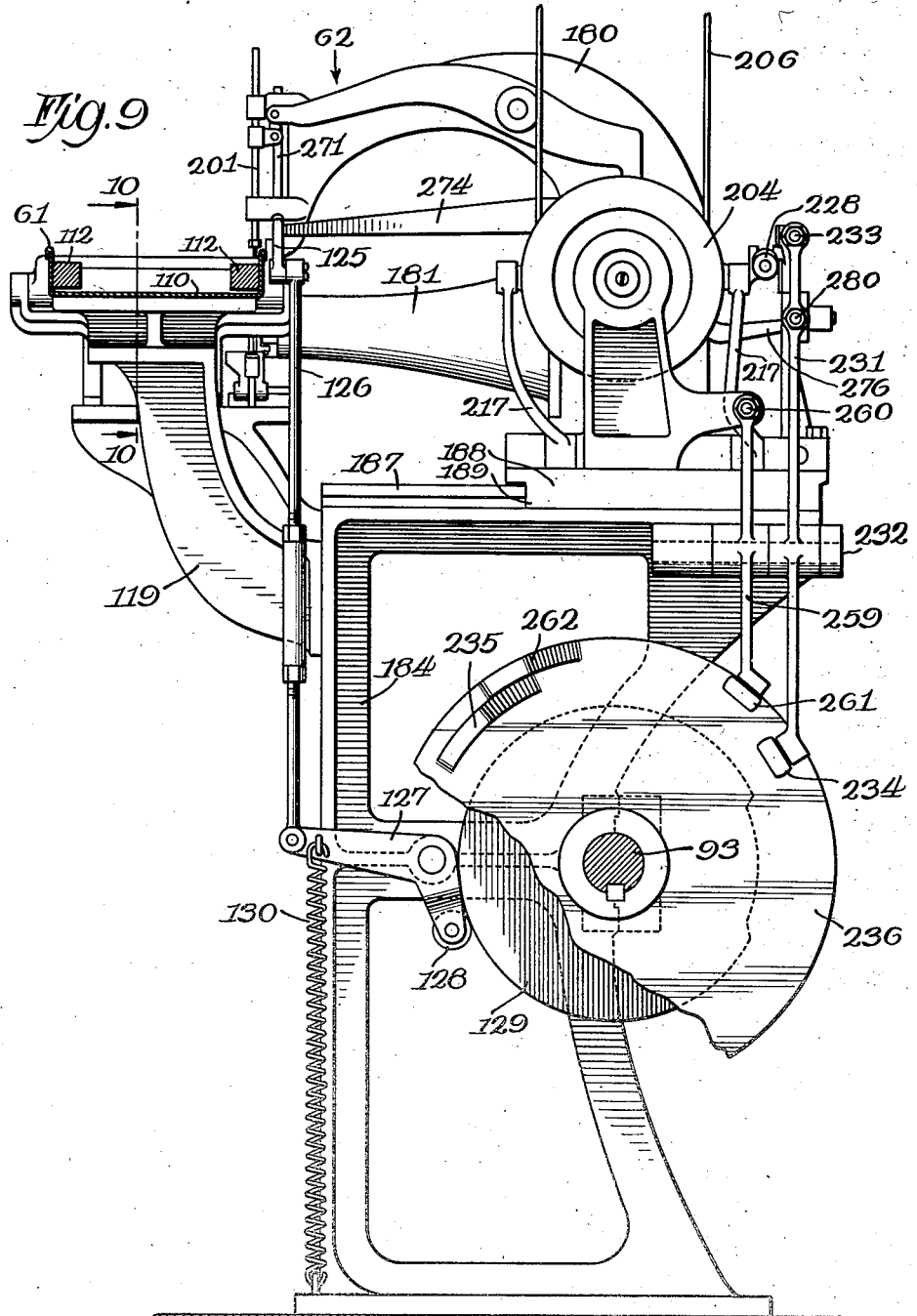

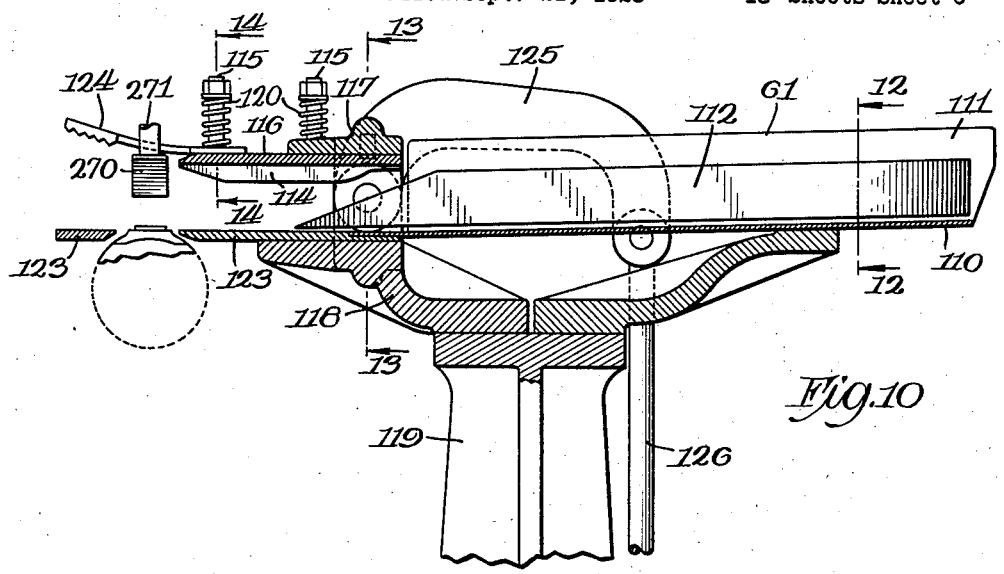
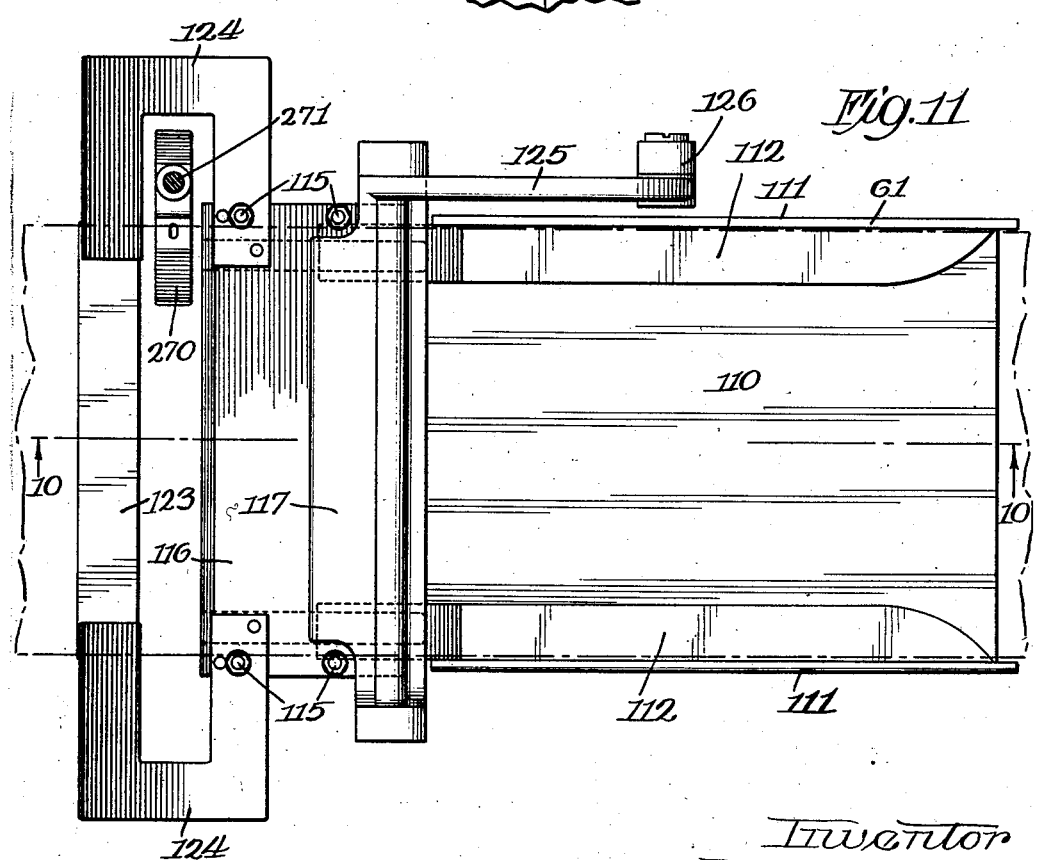

May 16, 1933.  J. F. GAIL  1,908,972
QUILTING MACHINE
Filed Sept. 21, 1928   18 Sheets-Sheet 7
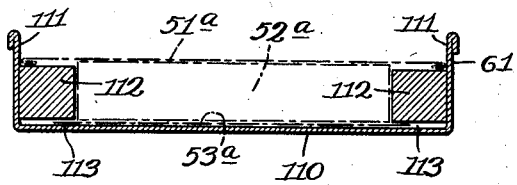
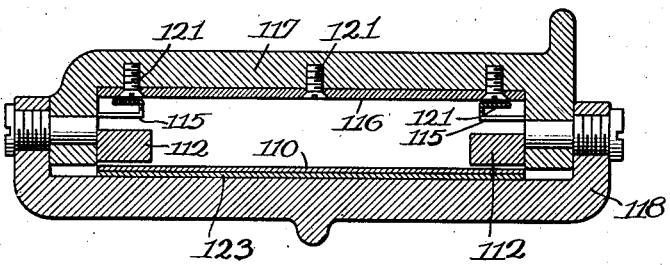
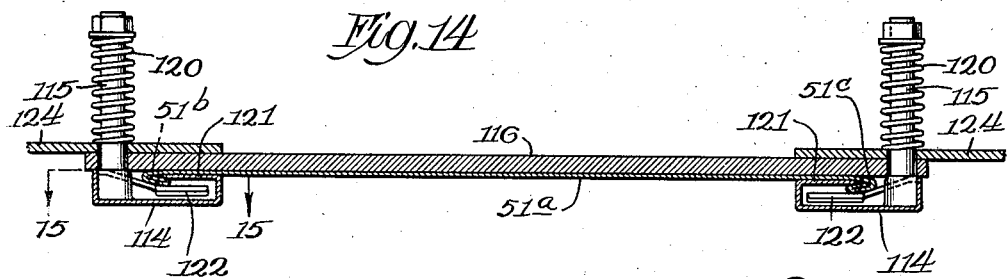
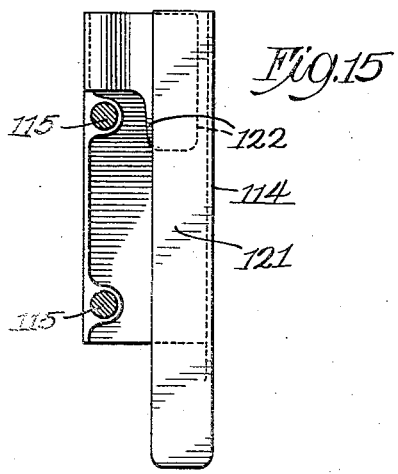
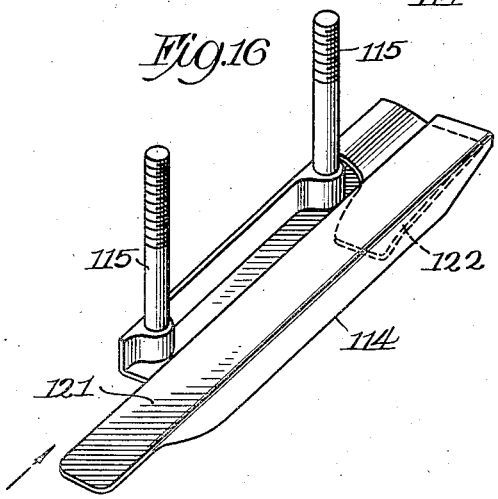
Inventor
John F. Gail
By Fisher, Clapp, Soans & Pond  Attys.

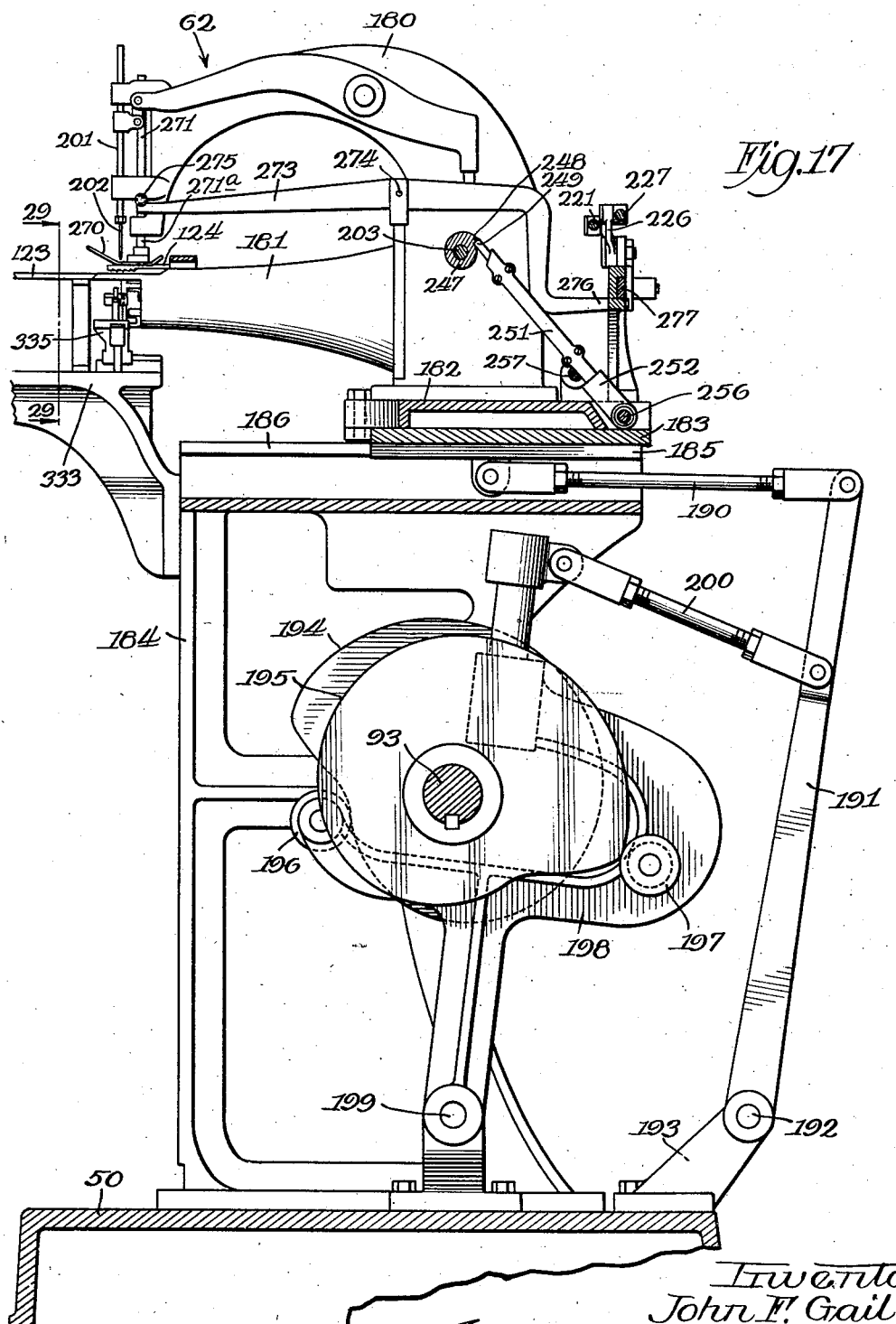

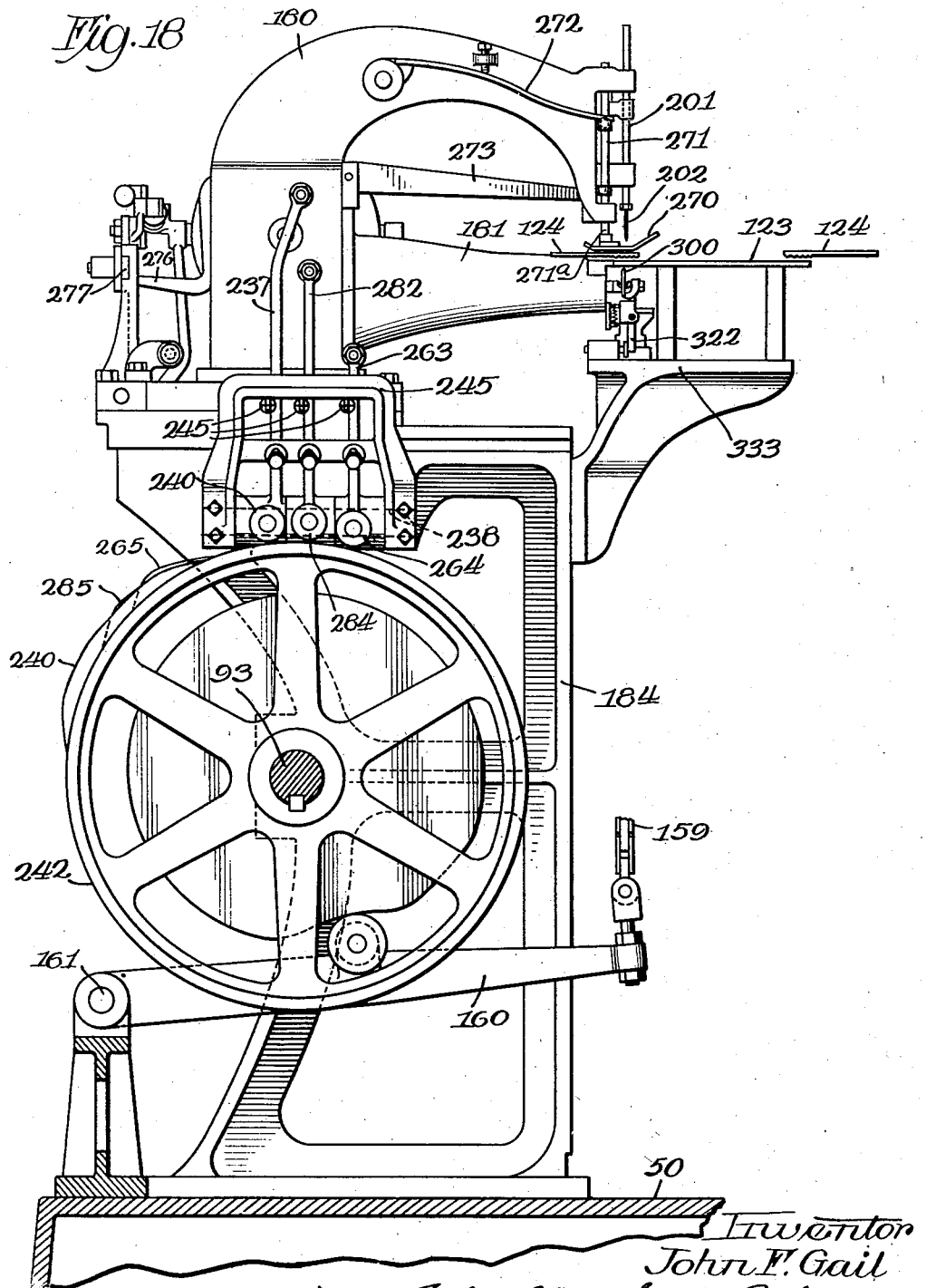

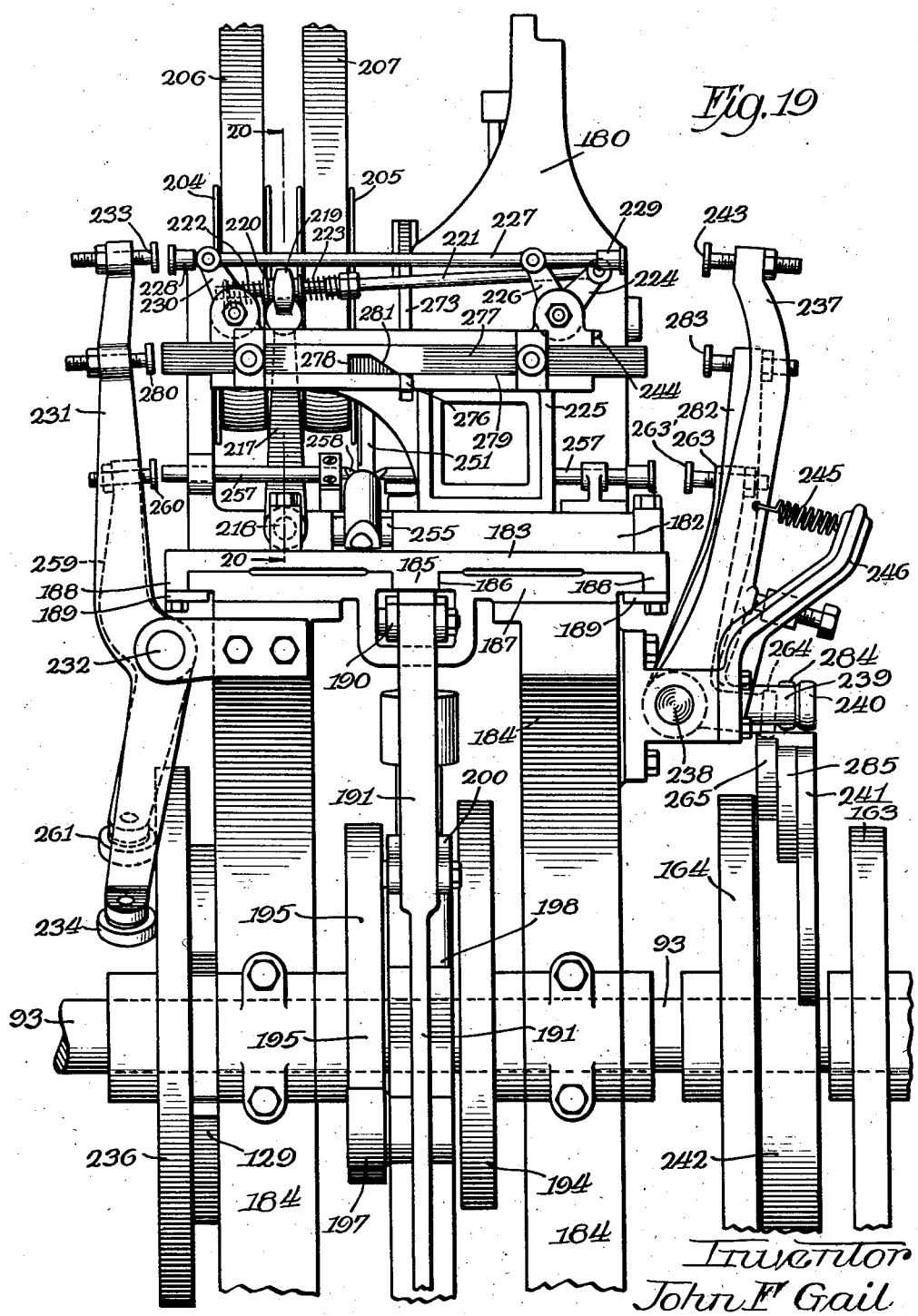

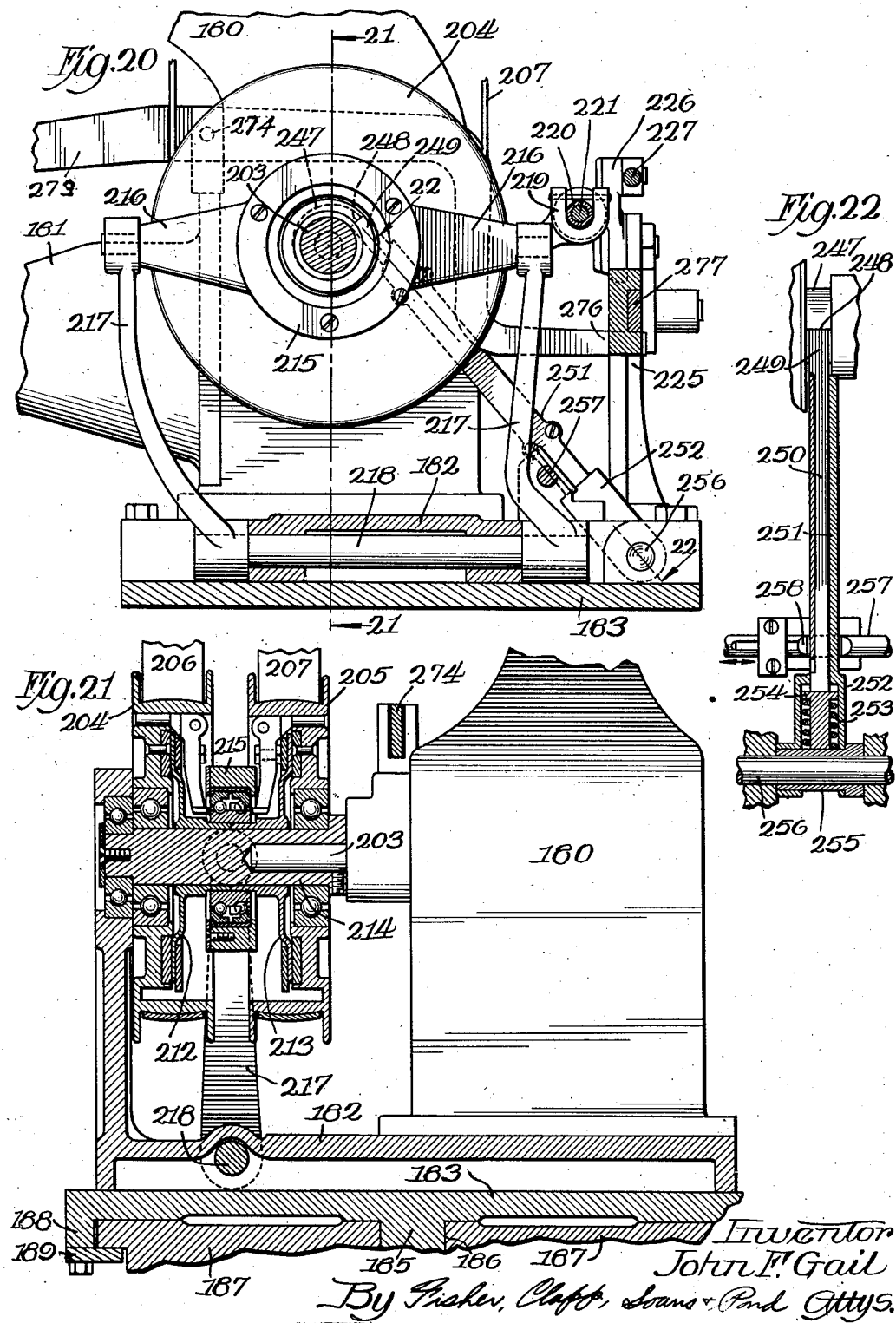

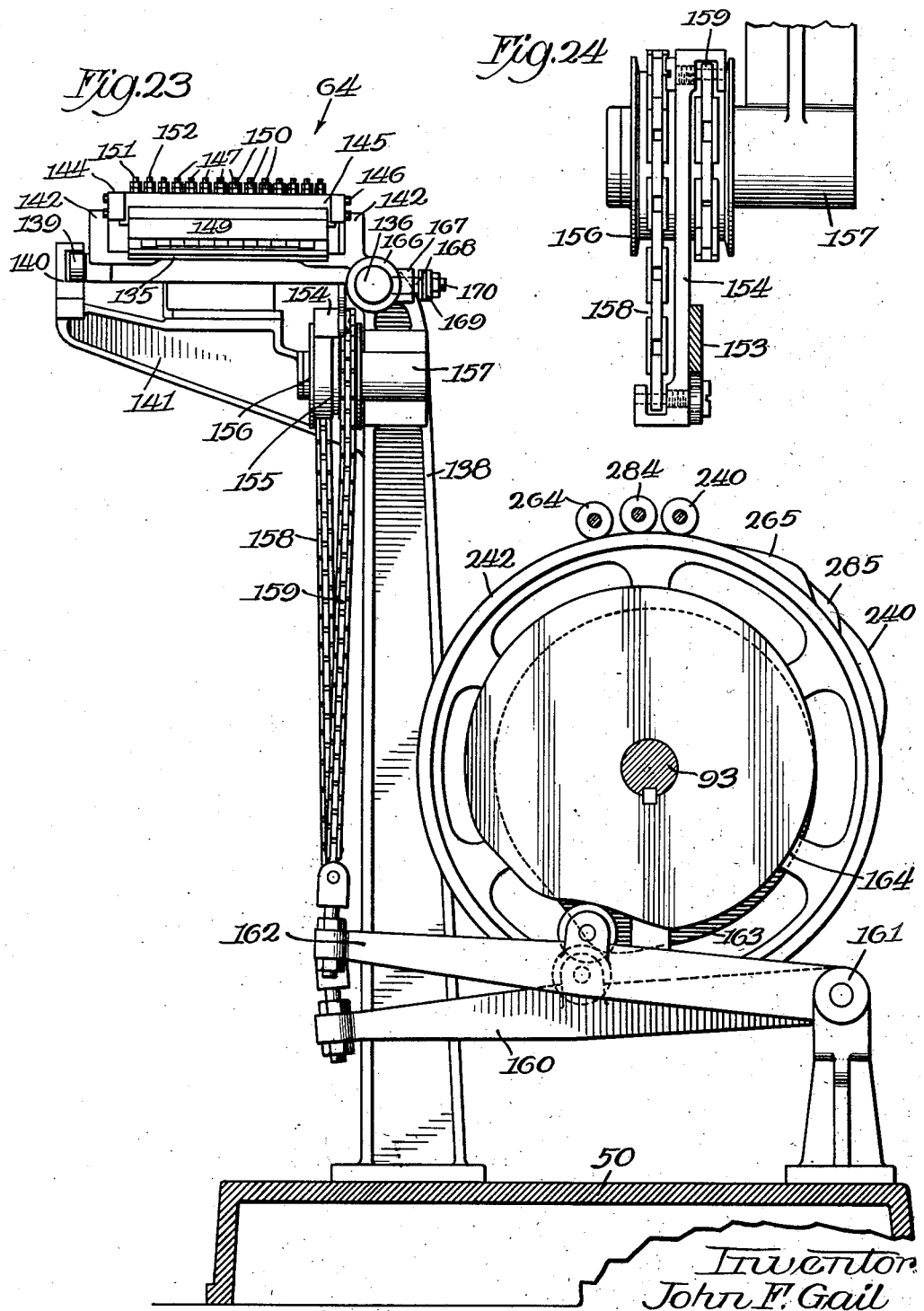

May 16, 1933.  J. F. GAIL  1,908,972
QUILTING MACHINE
Filed Sept. 21, 1928  18 Sheets-Sheet 13

Inventor
John F. Gail
By Fisher, Clapp, Soans & Pond Attys.

May 16, 1933.  J. F. GAIL  1,908,972
QUILTING MACHINE
Filed Sept. 21, 1928    18 Sheets-Sheet 14
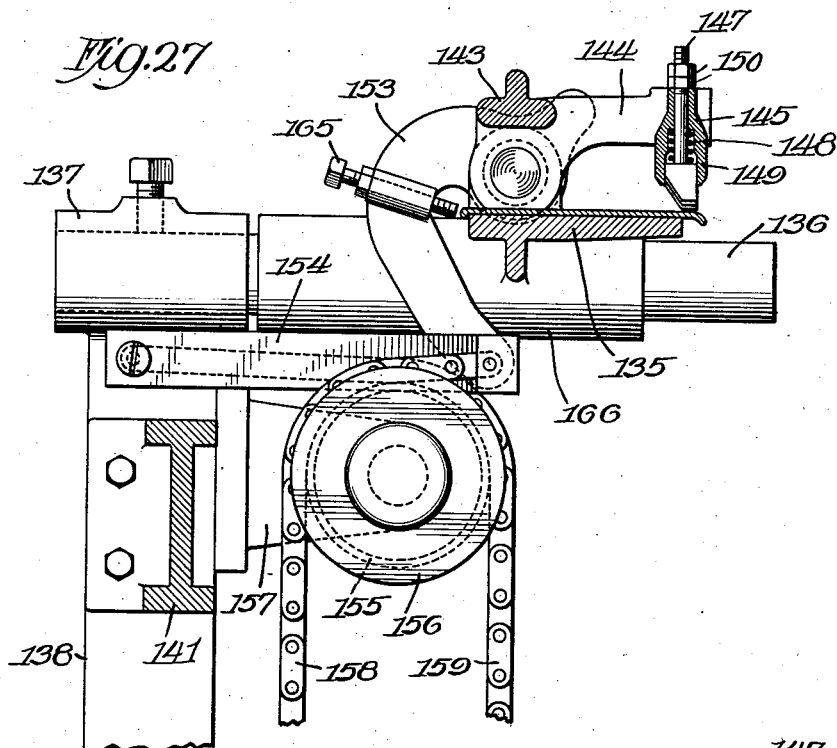
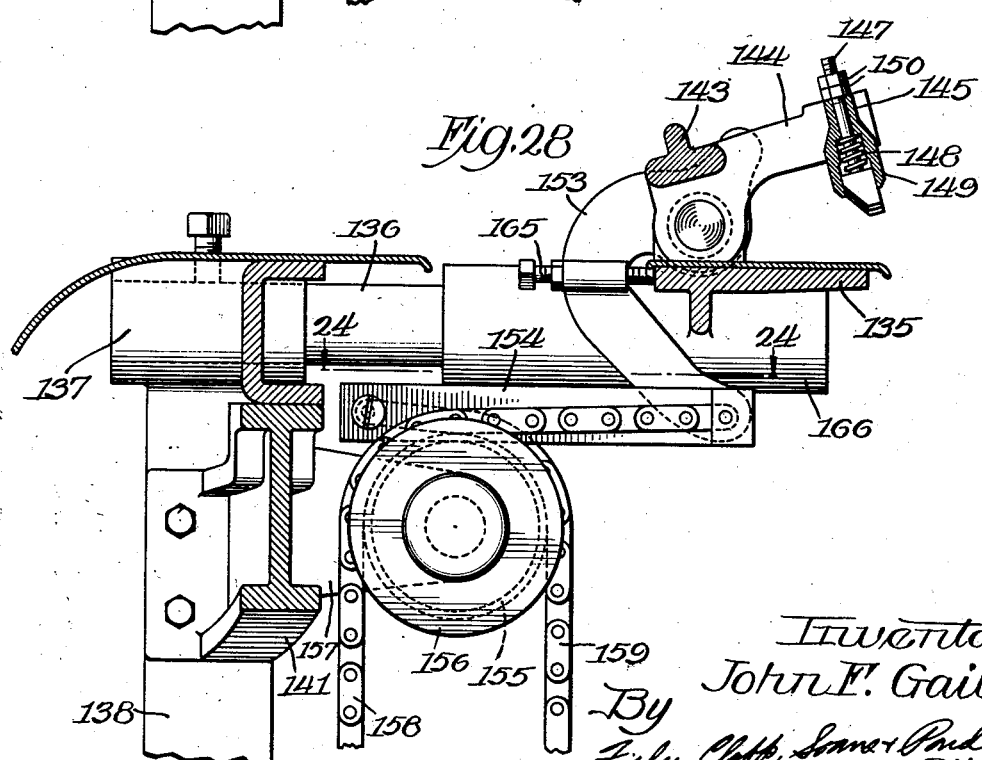

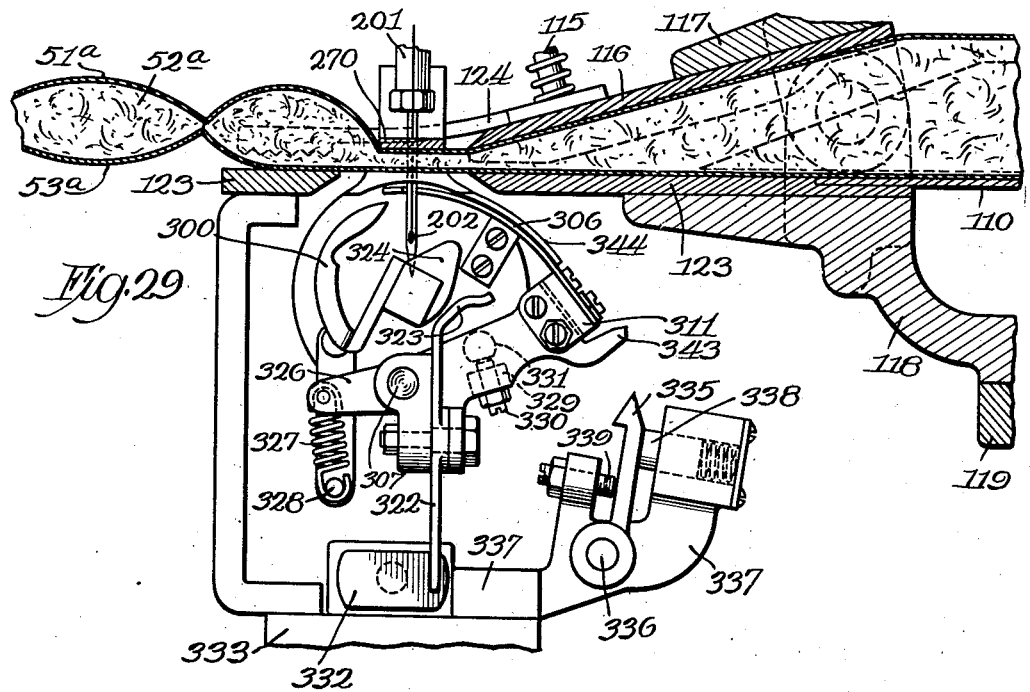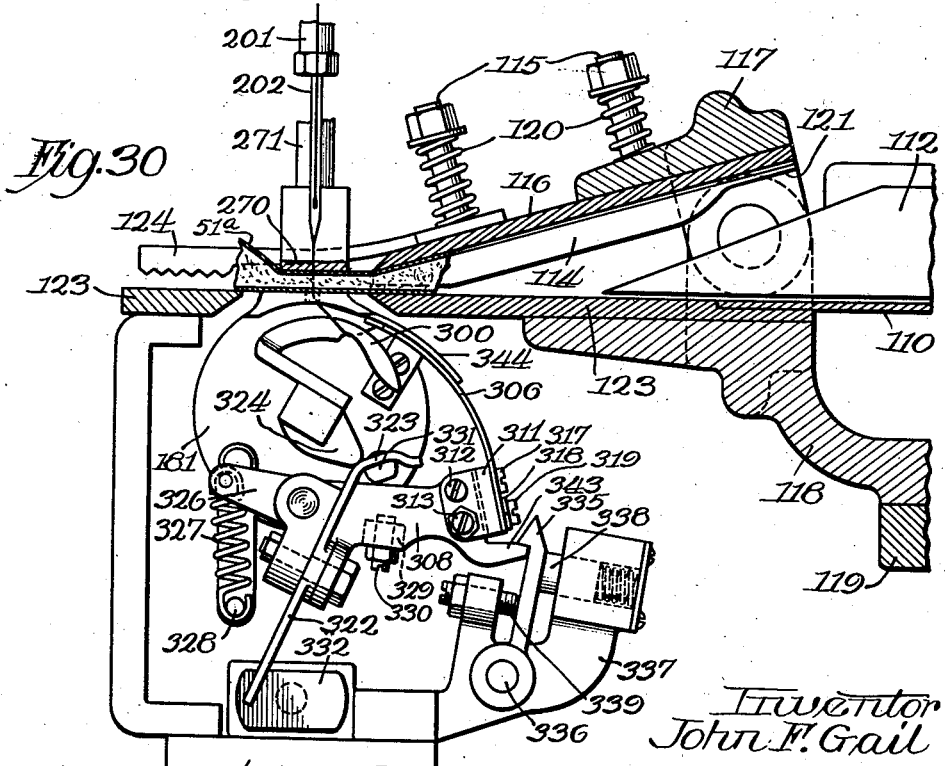

May 16, 1933.  J. F. GAIL  1,908,972
QUILTING MACHINE
Filed Sept. 21, 1928   18 Sheets-Sheet 16
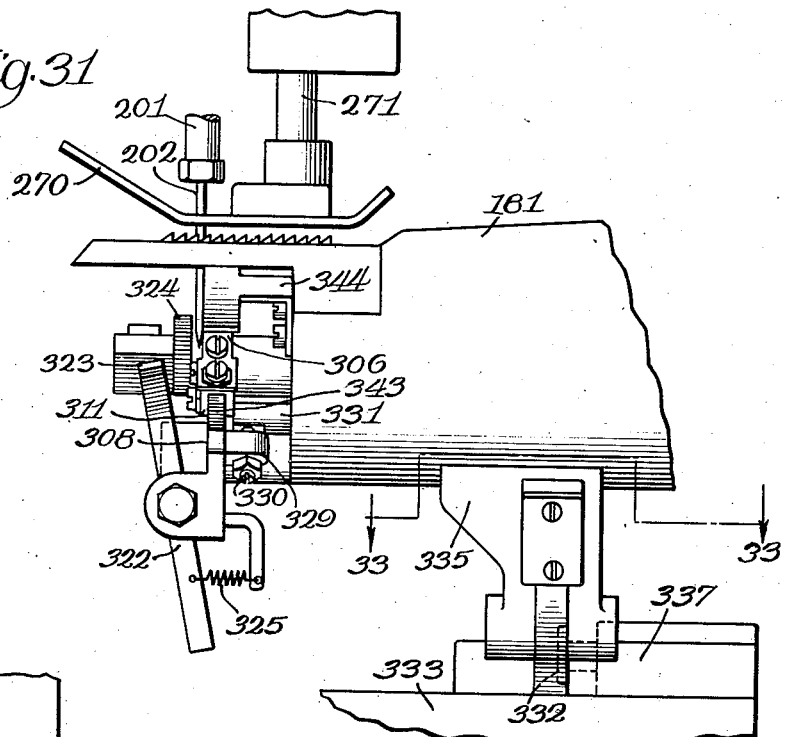
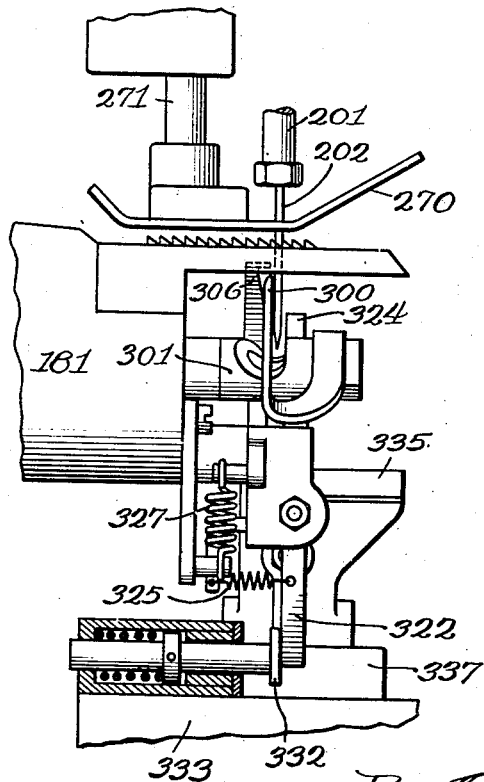
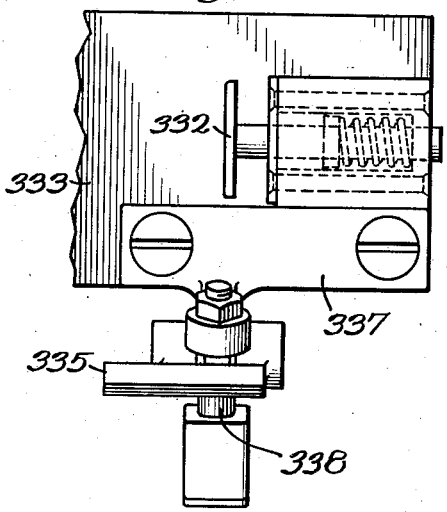
Inventor
John F. Gail
By Fisher, Clapp, Soans + Pond  Attys.

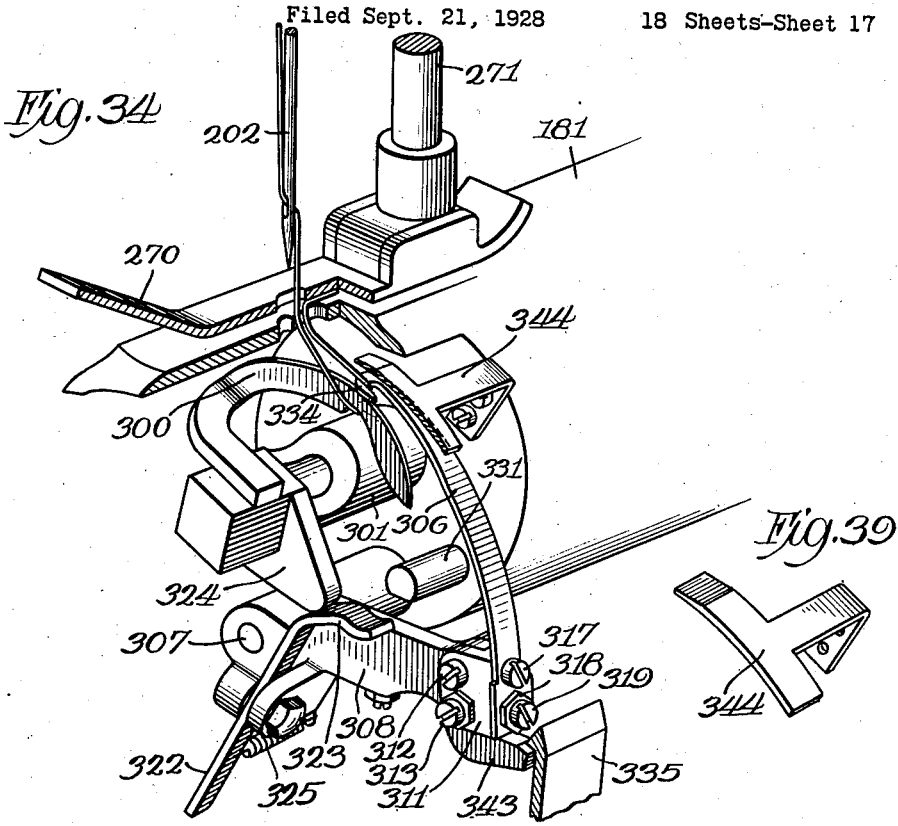
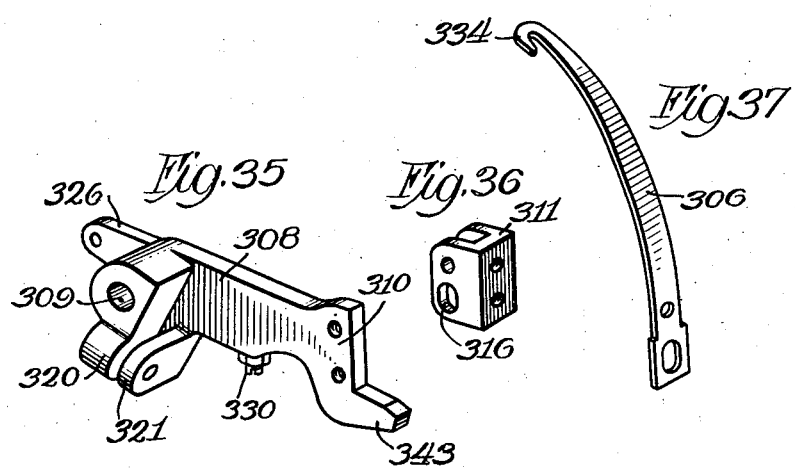
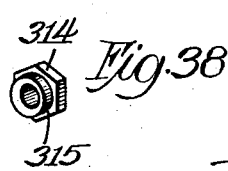

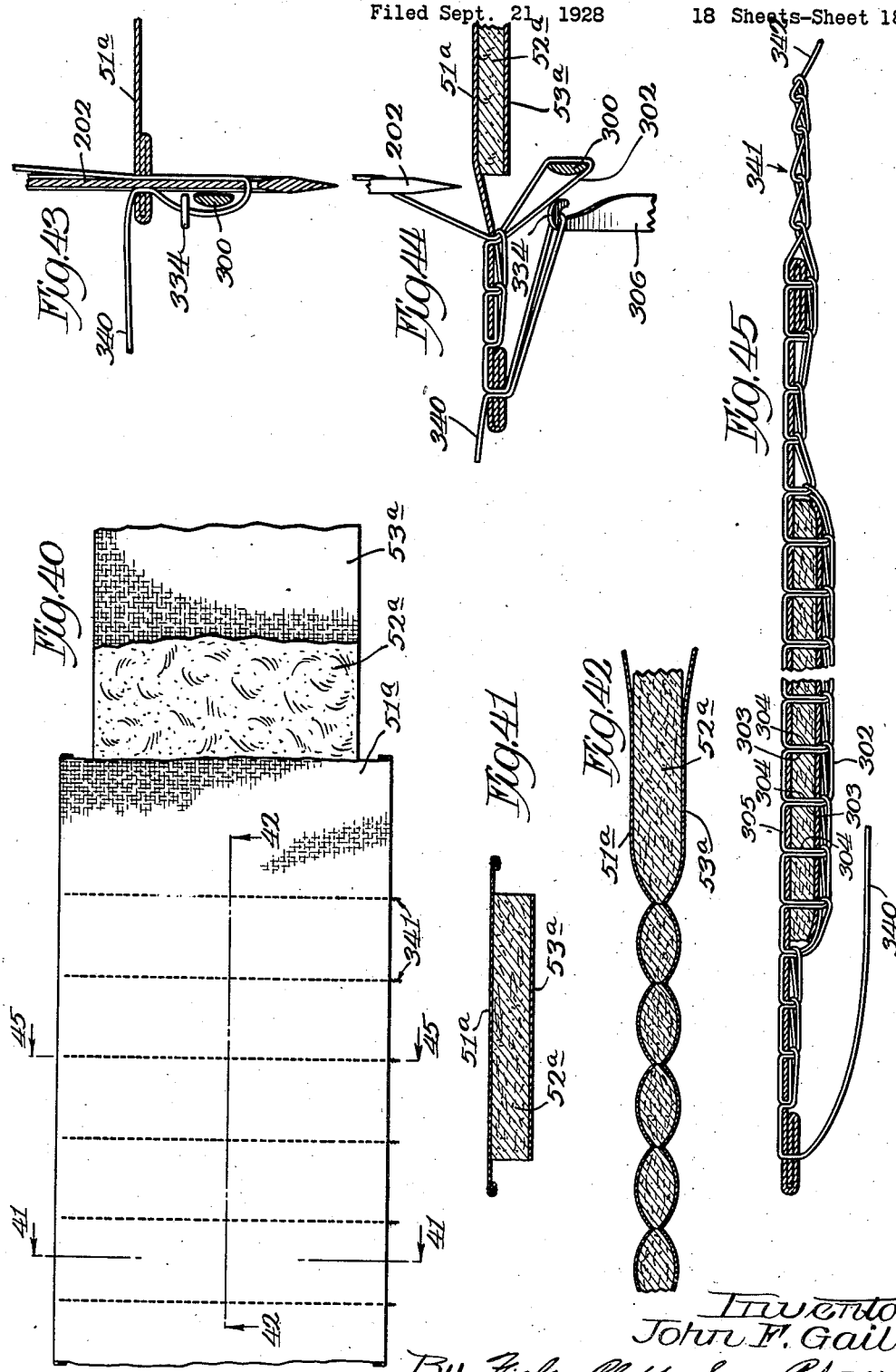

Patented May 16, 1933

1,908,972

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

QUILTING MACHINE

Application filed September 21, 1928. Serial No. 307,450.

This invention relates to quilting machines, and more particularly to a quilting machine which is particularly adapted for sewing together inner and outer strips of fabric between which a strip of padding is interposed, the said inner, outer and intermediate strips being sewed together along spaced, substantially parallel lines of stitching which extend crosswise of the length of the strips. The embodiment of my invention herein disclosed is in a machine which is designed for the purpose of making padded side walls for mattress or cushion boxings or the like; but it will be understood that the features of my invention are not limited to a machine for this specific purpose, such features being adaptable to other machines, such as are often called quilting machines.

The present embodiment of my invention includes, generally speaking, mechanism for supporting supply rolls of the strips of material which are to be sewed together, mechanism for advancing the said strips step by step, and for guiding the said strips into overlapping or superposed assembled relation, sewing mechanism preferably of the chain-stitch type, and mechanism for reeling the quilted or sewed-together, assembled strips.

In sewing machines of the chain-stitch type, the mechanism operates in such a way that the starting end of the sewing medium or thread projects from the top or needle side of the sewed material. In mattress or cushion boxings such as above referred to, it is objectionable that this starting end of the thread should project from the top side of the sewed strips, because of the fact that it is preferable to use the top side as the outside of the boxing. Accordingly, it has heretofore been necessary to cut off each of the projecting starting-end portions of the thread as close as possible to the surface of the outside strip of fabric, this operation often resulting in considerable loss due to accidental damage to the outer strip of fabric by cutting the same when attempting to cut the thread.

One of the principal objects of the present invention is, therefore, to provide mechanism which will automatically cause the starting end of the thread in a series of stitches to project from the lower face of the assembled strip, it being understood that the term "lower face" refers to the face of the assembled strips which is remote from the sewing needle. Another object of the invention is to provide mechanism which constitutes a part of the sewing mechanism, and which is actuated through the agency of the sewing mechanism to cause said starting end to project from the lower side or the assembled strips of material. The mechanism for accomplishing this object forms the subject matter of my co-pending applications, Serial No. 306,353, filed September 17, 1928, and Serial No. 402,494, filed October 25, 1929.

Other objects of the invention are to provide improved means for assembling a plurality of strips of material into relatively superposed position; to provide improved means for advancing the strips step by step; to provide improved means for clamping the assembled strips together adjacent the line of stitching, thereby to facilitate operation of the sewing mechanism; to provide mechanism for automatically reciprocating the sewing mechanism transversely of the length of the strips which are sewed together; to provide mechanism for causing the strips to be drawn taut throughout a portion of the length thereof adjacent the line of stitching, thereby to insure equal spacing of the lines of stitching; to provide an improved means for reeling the quilted or stitched-together strips into a roll for convenient subsequent use; to provide means for automatically actuating the various elements of the machine in cooperating, synchronized relation, and, in general, it is the object of the present invention to provide an improved machine of the type described.

Other objects and advantages of the invention will be understood by reference to the following specification and accompanying drawings in which I have illustrated a quilting machine such as above referred to.

In the drawings:

Fig. 2 is a side elevation showing a part of Fig. 1 on an enlarged scale.

Fig. 3 is a section on the line 3—3 of Fig. 1.

Fig. 4 is a section on the line 4—4 of Fig. 3.

Fig. 5 is a section on the line 5—5 of Figs. 2 and 6.

Fig. 6 is a section on the line 6—6 of Fig. 5.

Fig. 7 is a section showing certain parts of Fig. 6 in a changed position.

Fig. 8 is a detail section on the line 8—8 of Fig. 7.

Fig. 9 is a section on the line 9—9 of Fig. 1.

Fig. 10 is a section on the line 10—10 of Figs. 9 and 11.

Fig. 11 is a plan of the mechanism shown in Fig. 10.

Figs. 12, 13 and 14 are sections on the lines 12—12, 13—13 and 14—14, respectively, of Fig. 10.

Fig. 15 is a section on the line 15—15 of Fig. 14.

Fig. 16 is a perspective of the device shown in Fig. 15.

Figure 1:
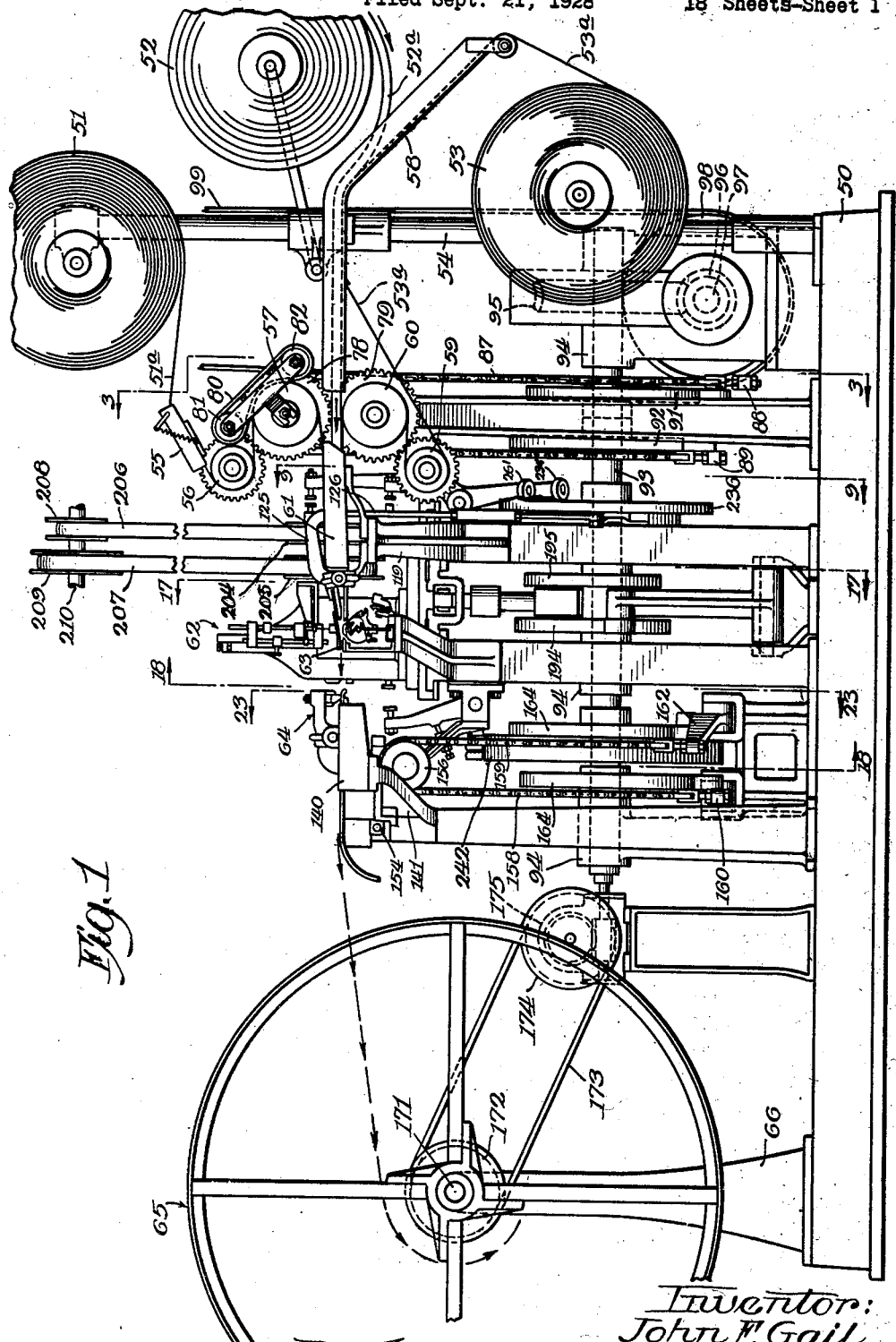
Fig. 1 is a side elevation.

Figs. 17 and 18 are sections on the lines 17—17 and 18—18, respectively, of Fig. 1.

Fig. 19 is a side elevation of the opposite side of a portion of the mechanism shown in Figs. 1 and 2.

Fig. 20 is a section on the line 20—20 of Fig. 19.

Figs. 21 and 22 are sections on the lines 21—21 and 22—22, respectively, of Fig. 20.

Fig. 23 is a section on the line 23—23 of Fig. 1.

Fig. 24 is a section on the line 24—24 of Fig. 28.

Figure 25:
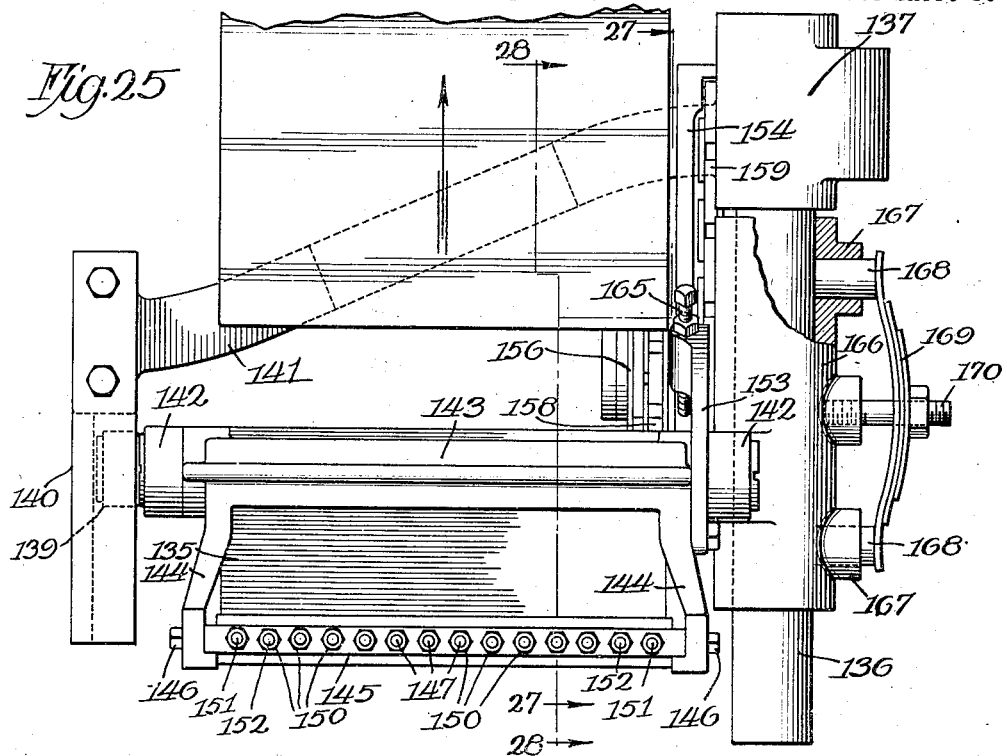

Fig. 25 is a plan of certain mechanism adjacent the left hand side of Fig. 2.

Figure 26:
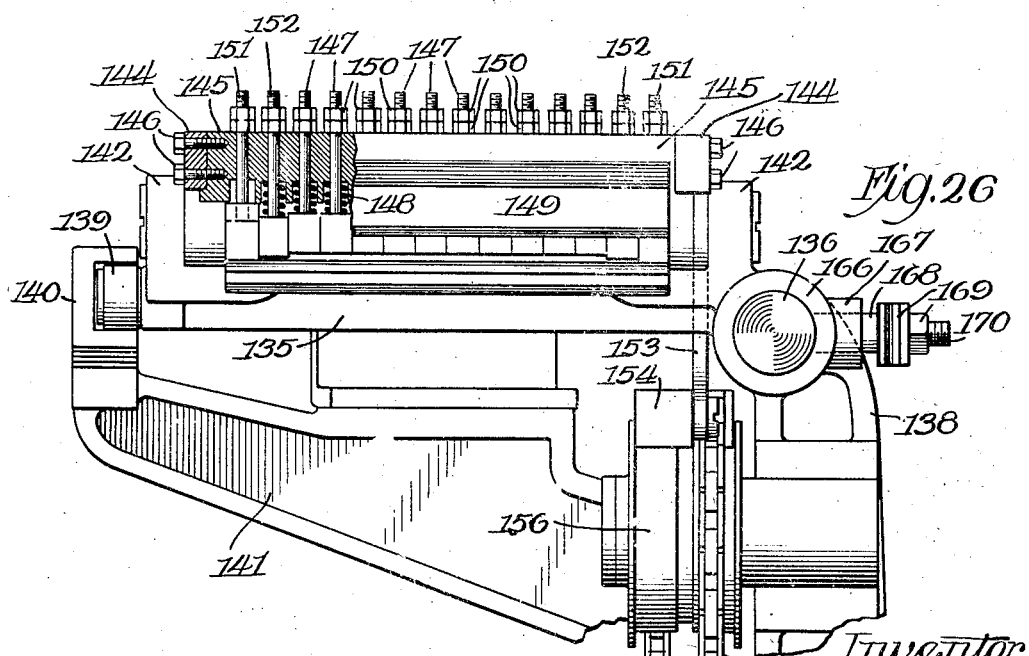

Fig. 26 is an end elevation of the mechanism shown in Fig. 25, certain parts being broken away to more clearly illustrate the structure.

Fig. 27 is a section on the line 27—27 of Fig. 25.

Fig. 28 is a section on the line 28—28 of Fig. 25, the mechanism being shown in a changed position.

Fig. 29 is a section on the line 29—29 of Fig. 17.

Fig. 30 is a section similar to Fig. 29, but showing some of the parts in a changed position.

Fig. 31 is an elevation on an enlarged scale of a part of the mechanism shown in Fig. 17, the parts being shown in a changed position.

Fig. 32 is an elevation of the opposite side of the mechanism shown in Fig. 31.

Fig. 33 is a section at the line 33—33 of Fig. 31.

Fig. 34 is a perspective on an enlarged scale showing certain parts of the sewing mechanism.

Figs. 35, 36, 37, 38 and 39 are perspectives of certain parts of the mechanism shown in Fig. 34.

Fig. 40 is a diagrammatic plan of the strips of material assembled and sewed together by the machine illustrated in the above-described figures.

Figs. 41 and 42 are sections on the lines 41—41 and 42—42, respectively, of Fig. 40.

Figs. 43 and 44 are diagrammatic illustrations of the operation of certain parts of the mechanism shown in the above-described figures.

Fig. 45 is a section on the line 45—45 of Fig. 40, extending crosswise of the assembled strips of material and through one of the lines of stitching.

Referring now to the drawings, and more particularly to Figure 1, my improved quilting machine consists of a plurality of elements preferably mounted on a single base member 50, whereby various units and supporting members may be mounted in permanently fixed position relative to each other. Supply rolls 51, 52 and 53 of material to be quilted are rotatably supported by suitable means carried by an upright member 54 which constitutes a part of the frame of the machine, and which, as clearly shown, is secured to the said base member 50. In the present embodiment of my invention, the supply roll 51 consists of a strip of textile material, such as ticking, which constitutes the outer face of the strip of boxing side wall which is produced by the machine herein shown. The roll 52 consists of a supply strip of suitable padding material, and the supply roll 53 consists of a strip of suitable inside facing, such as heavy muslin. The strip of ticking 51ª is drawn from the supply roll 51 and passes through a tensioning device 55 and around suitable guide and feed rolls 56 and 57. The strip of muslin 53ª is drawn from the supply roll 53 around a guide roll carried at the lower end of a chute 58, over a part of the said chute 58 and around guide and feed rolls 59 and 60, respectively. The strip of padding material 52ª is drawn from the supply roll 52, through a part of the chute 58 and between the strips 51ª and 53ª.

The three strips of material are thus brought into overlying or superposed position between the feed rolls 57 and 60, from whence they are guided through a guide chute 61 to the sewing machine mechanism indicated generally at 62, which is operated and reciprocated transversely of the length of the strips to sew the same together. Gripping or clamping mechanism, indicated at 63, is provided for clamping the three strips of material together adjacent the line of stitching so as to facilitate the operation of the sewing mechanism. Puller or feeding mechanism indicated generally at 64 is provided for gripping the three sewed-together strips and pulling the same forwardly, thereby to assist the feed rolls 57 and 60 to feed the material forwardly and also to insure that the length of the strips extending between the feed rolls 57 and 60 and the pulling mechanism 64 is drawn taut so that the spacing of the lines of stitching will be uniform and so that the same lengths of each of the strips of material will be disposed between the lines of stitching. The feed rolls 57 and 60 and pulling mechanism 64 are actuated intermittently so as to advance the strips step by step a predetermined distance, and the sewing machine 62 is reciprocated crosswise of the assembled strips after each step in the advancement of the strips. The puller mechanism is actuated in unison with the rolls 57 and 60 and preferably to an extent somewhat greater than the peripheral feeding movement of the said rolls, whereby the puller mechanism is effective to pull the strips taut between itself and the rolls. Since the rolls 57 and 60 limit the length of material pulled out by the puller mechanism, the rolls and their actuating mechanism may, for convenience, be referred to as feed control or measuring mechanism. From the puller device 64, the assembled and sewed-together or quilted strips are wound on to a reel 65 which is rotatably mounted in a suitable standard 66 carried by the base 50 and propelled in any suitable manner.

The description of the machine so far given is very general, and only generally describes the operation of my improved quilting machine. I will now proceed to describe the various elements in greater detail so as to enable a person skilled in the art to readily understand the operation of my improved machine.

*The feed control mechanism*

The tensioning device 55, through which the strip 51ª of ticking is drawn, consists of a channel-shaped member which is mounted on a bracket 67 which is secured to an upright 68, which in turn is mounted on the main base 50. A leaf or flap member 69 is pivoted in the side walls of the channel-shaped member, and a spring member 70 stretched between a pin carried by the bracket 67 and an arm 71, which may conveniently be a bent end portion of the pivot pin for the flap 69, serves to normally urge the outer end of the flap downwardly against the bottom wall of the channel member. The ticking strip 51ª passes between the spring-pressed flap 69 and the bottom wall of the channel-shaped member and from thence around the guide roll 56, from which it passes around the roll 57, as above explained. The feed or feed-control rolls 57 and 60 are of very similar construction, preferably such as shown in Fig. 4. Each roll consists of a hollow cylindrical member 72 which is provided with a plurality of longitudinally extending recesses 73 in its surface, in which recesses rows of pins 74 are seated in any suitable manner. The pins 74 project beyond the surface of the roll a distance sufficient to grip the fabric strip which extends around the roll and to thereby insure the desired amount of forward movement of such a strip with the roll. The roll 57 is rotatably mounted on a shaft 75 which is fixedly mounted in a seat 76 provided in the upright frame member or support 68.

The lower feed roll 60 is rotatably mounted on a shaft 77 which is also fixedly secured in the upright member 68. Gear members 78 and 79 are secured to the inner ends of the rolls 57 and 60, respectively, so that the same rotate in unison in opposite directions, whereby material fed between them will be propelled in the desired direction. The guide rolls 56 and 59 are also rotatably mounted on shafts supported by the upright member 68, and each of the guide rolls is provided with a gear meshing with the gear of the adjacent feed roll so that the feed rolls and guide rolls are propelled in unison. The pitch diameter of the respectively meshing feed and guide roll gears is, of course, such that their peripheral speed is the same. I have found that there is a tendency of the ticking strip 51ª to slip off the pins 74 of the feed roll 57, and to overcome this tendency to slip, I provide a belt 80 which extends around rollers 81 and 82 which are mounted in a bracket 80ª in such a position relative to the feed roll 57 that the lower reach of the belt is caused to tightly engage the surface of the feed roll so that the ticking which passes between the feed roll and lower reach of the belt cannot slip off the said pins.

The bracket 80ª is pivotally mounted at one end of the shaft 80ᵇ of the guide roll 56 so that the bracket may be swung towards or from the feed roll 57. For holding or locking the bracket in the desired position of adjustment relative to the feed roll, I provide screw means, as shown in Fig. 5, wherein a screw 80ᶜ threadedly engages a part of the frame member 68 so as to pull the bracket towards the feed roll, and a screw 80ᵈ threadedly engages a part of the bracket 80ª and abuts a part of the frame member 68 so as to force the bracket 80ª away from the feed roll. It will be apparent that the screw means 80ᶜ and 80ᵈ cooperate to lock the bracket 80ª and the belt 80 in the desired position of adjustment relative to the feed roll 57. The above-described form of mounting for the belt 80 permits the same to be readily swung away from the feed roll, thereby facilitating passage of the ticking strip 51ª around the feed roll when a new strip of ticking is fed to the machine. A suitable bracket, such as clearly shown in Figures 1, 2 and 5, may be provided and releasably secured or clamped to the end of the shaft 75 for supporting the outer ends of the rolls 81 and 82.

The feed rolls 57 and 60 are intermittently rotated so as to advance the respective strips step by step. The mechanism for effecting such intermittent rotation of the feed rolls consists of the following form of pawl-and-ratchet mechanism: A ratchet member 83 having spaced peripheral notches 84 is secured to the inner end of the feed roll 57, suitable means such as screws 85 (see Fig. 5) being provided for securing the ratchet to the said end, the said screws also serving to secure the gear 78 to the said feed roll. A sprocket 86 is rotatably mounted on the shaft 75 adjacent the inner end of the feed roll 57, and a chain 87 which engages and extends around the sprocket is secured at its free ends to the outer ends of levers 88 and 89, which are pivoted as indicated at 90 on a suitable bracket provided for that purpose. The levers 88 and 89 are each provided with rollers intermediate their ends, as clearly shown in Fig. 3, the roller mounted on the lever 88 being adapted to engage a cam 91 and the roller carried by the lever 89 engaging a cam 92. The cams 91 and 92 are keyed to the main drive shaft 93 of the machine which is rotatably mounted in suitable bearings, such as 94, and driven in a suitable manner.

In the present instance, I have shown the shaft 93 as being provided with a worm wheel 95 which meshes with a worm gear 96 carried by a shaft 97 which is rotatably mounted in suitable bearing members and which may be rotated by means of a pulley 98 secured thereto, and a belt 99 which extends around the pulley 98 and around a suitable pulley on a main line shaft. Any other suitable mechanism may be provided for rotating the shaft 93, but the above-described form of mechanism has been found to be very satisfactory in operation.

The cams 91 and 92 are thus rotating cams, and, as shown in Fig. 3, their peripheries are such that they will be effective to oscillate the arms 88 and 89 simultaneously in opposite directions. It will be seen that the sprocket 86 will thereby be oscillated on the shaft 75. A pawl 100 is carried by the sprocket 86 through the agency of a bracket 101 which is secured to the sprocket, and a spring 102 stretched between the outer end of the pawl and a pin carried by the sprocket serves to yieldingly hold the outer end of the pawl in engagement with the periphery of the ratchet 83. Obviously, the free end of the pawl 100 will enter the notches 84 in the ratchet under the influence of the said spring 102, so that when the sprocket 86 is oscillated, the pawl 100 will be effective to successively enter the notches in the ratchet and thereby to advance the ratchet and parts secured thereto. The pawl 100 is provided with a rounded inner face, as shown at 102′, which permits the pawl to ride up over the rear edge of the respective notches so as to be disengaged therefrom when the pawl is moved rearwardly.

The upright frame member 68 is provided with a bracket portion 103 which carries a pair of spring-pressed pawls 104 and 105 which are adapted to be seated at their outer or free ends in the notches 84 of the ratchet to prevent accidental movement of the ratchet beyond predetermined limits or in a reverse direction. A flat spring 106 secured to the end of the bracket part 103 serves to yieldingly urge the pawls into the said notches. By inspection of Figs. 6 and 7, it will be readily understood that the pawl 105 is effective to prevent rearward movement of the ratchet when the sprocket and the pawl 100 move in a rearward direction. The pawl 104 is provided with a roller 107 which is adapted to be engaged by a cam piece 108 which serves to raise the pawl 104 out of engagement with one of the notches 84 to permit the pawl 100 to advance the ratchet as above explained. It will be apparent from an inspection of Figs. 6 and 7 that when the sprocket 86 and pawl 100 move rearwardly from advanced position, as shown in Figs. 6, the cam 108 will engage the roller 107 and thereby lift the pawl 104 out of the notch 84. The pawl 104 is thus disengaged from the notch 84 in such timed relation with the engagement of the pawl 100 with the next notch that the pawl 104 will be ineffective to hold the ratchet against forward rotation. When the sprocket and pawl 100 approach the limit of forward movement, the free end of the pawl 104 enters another notch in the ratchet to prevent overthrow of the ratchet.

*The guide chute 61 and the gripping or clamping mechanism 63*

The three strips of material which pass between the feed rollers 57 and 60 are guided through a chute 61 which consists of a channel-shaped sheet metal member having a bottom wall 110 and side walls 111, 111. By reference to Figs. 40, 41 and 45, it will be understood that the top or ticking strip is considerably wider than the lining strip and padding strip. It is desirable that the three strips be so assembled that the lining strip and padding strip will be centrally disposed of the ticking strip, thereby leaving marginal portions of the ticking strip of equal width on both sides of the padding and lining strips. For so centralizing the lining and padding strips, the guide or chute 61 is provided with filler members 112, 112 which are disposed at its opposite sides so as to reduce the width of the channel to approximately the width of the lining and padding strips. The marginal portions of the ticking strip will project over the filler members 112 as indicated in Figure 12. The lining strip 53ª is preferably of slightly greater width than the padding strips 52ª, for which reason grooves or spaces, such as shown at 113, 113, are provided between the bottom of the fillers 112, 112 and the bottom wall 110 of the channel chute 61. The grooves 113 receive the projecting marginal portions of the lining strip 53ª, as is clearly seen in Figure 12.

One of the important functions of the gripping mechanism 63, which receives the assembled strips of material from the chute 61, is to compress the strips together in a zone extending along the line of stitching, and another important object is to hold the strips in spread condition crosswise of their length. This latter object is particularly true with respect to the ticking strip because of the fact that the ticking strip subsequently constitutes the outer face of a mattress boxing and should therefore be neat in appearance. The strip of ticking 51ª is provided with hemmed edges, as shown at 51ᵇ and 51ᶜ in Fig. 14, the operation of hemming the strip being performed before the strip is supplied to the quilting machine. For maintaining the ticking strip spread crosswise of its length, I provide guide members 114, 114, having guide posts 115 projecting upwardly therefrom and passing through suitable apertures provided in a plate 116. The plate 116 is secured to a bracket 117 which is pivoted at its opposite sides in a bracket 118 which is carried by an upright member 119, the latter being preferably in the form of a bracket mounted on a portion of the main supporting frame structure. Springs 120 disposed around the posts 115, and preferably compressed between the top of the plate 116 and nuts on the respective posts, serve to yieldingly urge guide members 114, 114 towards the bottom face of the plate 116. As shown in Figs. 14, 15 and 16, the guide members 114 are provided with outwardly facing, substantially horizontally disposed portions 121, the outer edge portion of which is adapted to enter between the turned-over marginal portions of the ticking. The ticking passes between the portions 121 of the guide members 114 and the bottom face of the plate 116 and is yieldingly pressed against the latter by the springs 120. For preventing the turned-over or hemmed portions of the ticking from pulling around the outer edges of the guide portions 121, I provide the guide members 114 with spring plate portions 122 which force the inner edges of the turned-over portions upwardly against the inner or lower face of the guide portions 121.

When the assembled strips are moving forwardly, the bracket 117, plate 116 and parts carried thereby are in inoperative position, substantially as shown in Fig. 10. When in this position, the strips are not compressed and may freely move over the table plate 123 which is secured to the bracket 118 in any suitable manner, so as to form in effect a continuation of the bottom 110 of the chute 61. When the three strips have been advanced to the extent desired, the bracket 117 and parts secured thereto, which may be termed in their entirety a gripping jaw, are swung about the pivots of the bracket 117 into the position shown in Figs. 29 and 30. U-shaped members 124 (see Fig. 11) are secured to the plate 116 at its opposite ends in the manner shown, so that one leg of each of the U-shaped members is spaced from the forward edge of the plate 116 and is adapted to clamp the edges of the strips of material against the forward end portion of the table plate 123. By this means, the three strips are effectively held in spread condition and the thickness of the combined strips reduced, as clearly shown in Figs. 29 and 30, to facilitate operation of the sewing mechanism.

The mechanism for swinging the gripping jaw about the pivots of the bracket 117 includes an arm 125, preferably formed as an integral part of the member 117, and a link 126 which is pivotally connected at its upper end to the outer end of the arm 125 and at its lower end to the end of one arm of a bell crank 127 (see Fig. 9). The bell crank 127 is pivotally mounted on one of a pair of upstanding frame parts 184—184, which said frame part serves to support the frame part or bracket 119 and other parts of the machine. The other arm of the bell crank 127 is provided with a roller 128 which engages the periphery of a cam 129 which is keyed to the rotating shaft 93. The periphery of the cam 129 is so shaped that it will effect periodic rocking of the bell crank 127 and, consequently, rocking or pivotal movement of the gripping jaw. A spring 130, stretched between a part of the bell crank 127 and a stationary frame part, serves to yieldingly hold the gripping jaw in up or inoperative position and the roller 128 in engagement with the periphery of the cam 129.

*The pulling mechanism 64*

When the three assembled strips are held stationary, between successive steps of advancement, and the clamping mechanism 63 actuated as above described, the sewing mechanism 62 is actuated to stitch the three strips together. For convenience, I prefer to describe the operation of the sewing mechanism after I describe the puller mechanism which cooperates to some extent with the feed rolls 57 and 60 to feed the strips of material forwardly, and which serves to insure that the length of the strips between the feed rolls and puller mechanism is drawn taut. The puller mechanism is best shown in Figs. 23 to 28 inclusive. The puller mechanism consists principally of a table bracket 135 which extends crosswise of the length of the strips and is disposed thereunder so that the strips pass thereover. The table bracket 135 is reciprocably mounted at one end on a stub shaft 136 which is fixedly mounted in a suitable bearing 137 provided as a part of a frame member 138. The opposite end of the table bracket 135 is provided with a roller 139 which is disposed in a channel-shaped track 140 which serves to support and guide the outer end of the said table bracket. The track 140 is mounted on a stationary bracket part 141, which may be formed as an integral part of an adjacent frame member, or the bracket 141 may be a separate member secured to a conveniently located frame member in any suitable manner.

The table bracket 135 is provided with upstanding ears 142, 142 to which a bracket 143 is pivotally connected. The bracket 143 is provided with a pair of rearwardly projecting arms 144, 144, between which a bar 145 is fastened by means of bolts or screws such as 146. The bar 145 is provided with a plurality of spaced, substantially parallel apertures in which headed gripper pins 147 are mounted. The bar 145 is counter-bored at the lower end of each of the pin-receiving apertures so as to form a seat adapted to receive coil springs 148 which are compressed between the respective seats and heads of the gripper pins 147, as shown in Figs. 26, 27 and 28. As clearly shown in Figs. 27 and 28, the bar 145 is provided with an enlarged lower edge portion 149 which is also recessed to receive the heads of the respective pins. The pins are thus rigidly supported against forward and backward movement and yieldingly urged downwardly from the bar 145, such downward movement being limited by means of adjusting nuts 150 which are provided on the upper ends of each of the gripping pins 147.

Mechanism which I will hereinafter describe is provided for swinging the bracket 143 on its pivotal mounting in the ears 142 of the table bracket so that the heads of the pins 147 are forced towards the table 135 and are therefore operative to yieldingly grip the three strips of material which pass between the said pins and table bracket. The outer pins 151, 151 of the row of pins are preferably fixed in position with their heads projecting a predetermined distance below the heads of the other pins. These outer pins engage the top of the table bracket 135 to limit pivotal movement of the bracket 143. The next outer pins 152, 152 are adjusted so that their heads project downwardly slightly beyond the heads of the other pins, all of which are adjusted so that their heads extend downwardly to substantially the same plane. This arrangement is desirable so as to accommodate the varying thicknesses of the assembled strips, it being remembered that the ticking strip is somewhat wider than the other two strips and projects beyond the edges thereof.

The mechanism for swinging the bracket 143 on its pivot and for reciprocating the table bracket 135 will now be described: A downwardly bent arm 153 is formed integral with or secured to the bracket 143, and an arm 154 is pivotally secured at one end to the lower end of the said bent arm 153. The arm 154 fits in a groove 155 provided in a pulley or sheave 156 which is rotatably mounted on a pin carried by a bracket 157 which is secured to the frame member 138. Chain members 158 and 159 extend upwardly over the pulley 156, the chains being disposed on opposite sides of the arm 154, and are connected to the opposite ends of the arm 154 in any suitable manner, for instance, as shown in Fig. 24.

The lower end of the chain 158 is connected, as shown in Figs. 1 and 23, to the outer or free end of a lever 160 which is pivoted at its other end in a bracket 161 which is carried by the base 50. The lower end of the chain 159 is connected to the outer end of a lever 162, which at its other end is also pivoted to the bracket 161. The levers 160 and 162 are provided with rollers intermediate their ends which respectively engage cams 163 and 164 which are carried by the shaft 93. The rollers on the arms 160 and 162 engage the peripheries of the said cams, which peripheries are so shaped that the chains 158 and 159 are simultaneously reciprocated in opposite directions, whereby the arm 154 is also reciprocated, being guided in the groove 155 of the pulley 156. It will be apparent that when the arm 154 is moved to the right from the position shown in Fig. 27 to the position shown in Fig. 28, the arm 153 and bracket 143 will be swung on the pivot of the bracket 143. The arm 153 is provided with an adjustable stop screw 165 which is adapted to engage the rear edge of the table bracket 135 as shown in Fig. 28, to limit pivotal movement of the bracket 143 in one direction. The extent of movement of the arm 154 is such that the bracket 143 will be swung to its limit of pivotal movement. Continued movement of the arm 154 is effective to move the pulling mechanism as a whole to the right, from the position shown in Fig. 27 to the position shown in Fig. 28. When the action is reversed, bar 145 is first swung downwardly until the pins grip the material, and the mechanism then travels back to the position shown in Fig. 27, drawing the material along with it. The said pulling mechanism is guided on the shaft 136 and track 140, as above explained. For guiding the table bracket 135 on the shaft 136, the table bracket is provided with an elongated bearing portion 166 which is slidable on the shaft 136. The bearing portion 166 is provided with a pair of bosses 167 having apertures therethrough which receive the pins 168. The pins 168 are yieldingly urged into frictional engagement with the shaft 136 by means of a leaf spring device 169 which is anchored to the bearing 166 by means of a bolt and nut 170. The frictional engagement of the pins 168 with the shaft 136 serves to prevent the pulling mechanism from moving along the shaft until after completion of the pivotal movement of the bracket 143. Hence, the initial part of the movement of the arm 154 is effective to swing the bracket 143 on its pivot, and the latter part of the movement of said arm effects horizontal movement of the pulling mechanism as a whole.

The extent of pulling movement of the puller mechanism is preferably somewhat greater than the length of material advanced by each step of movement of the feeding rolls 57 and 60. The initial portion of the movement of the puller mechanism is simultaneous with the feeding movement of the feed rolls, and the latter part of the movement of the puller mechanism occurs after the feed rolls have completed their feeding movement. It will, of course, be understood that the movement of the puller mechanism is continuous, and that because of the excessive length of movement the strips pulled thereby will be pulled taut for the purposes above brought out. It will be noted that because of the excess movement of the puller mechanism, the headed pins 147 and table bracket 135 will in some cases be required to slip over the strips when they have been pulled tight enough. Such slipping is permitted by the yielding action of the gripping pins 147. It will therefore be understood that although the rolls 57 and 60 serve as feed rolls, they also serve to control or limit the feeding action of the pulling mechanism just described. Hence the rolls 57 and 60 will be referred to as feed control rolls.

From the puller mechanism 64, the quilted strips are fed to the reeling mechanism 65 and there wound into a roll for convenience in handling and subsequent use. The reeling mechanism 65 may be any suitable form of mechanism, but preferably consists of a relatively large diameter reel which is rotatably mounted on a shaft 171. The mechanism for rotating the reel preferably consists of a slipping clutch device of any well known form and indicated generally at 172, which may be rotated by means of a belt 173 which is continuously driven by means of a pulley 174, the latter being carried by a speed reducing unit 175 which is driven by direct connection with shaft 93. The details of the reeling mechanism form no part of the present invention and therefore need not be more fully described.

*The sewing mechanism 62*

The sewing mechanism 62 consists, generally speaking, of a sewing machine head having an upper arm 180 and a lower arm 181, each of which serves as a housing or support for certain mechanism well known in the art. The sewing machine head is mounted on a base member 182 (Fig. 17) which is secured in any suitable manner to a table plate 183 which is reciprocably mounted on the previously mentioned pair of upright frame members 184. The mounting for the plate 183 is best shown in Fig. 19, wherein it can readily be seen that the plate is provided with a central or intermediate depending tongue 185 which fits closely in a slot or way 186 provided in the top plate 187 which is mounted on the upper ends of the said upright frame members 184. The outer edges of the plate 183 are provided with depending flanges 188, 188 which fit over the outer edges of the said top portion 187 and which receive gibs 189, 189, for slidably retaining the plate 183 on the top of the said upright frame member 184.

Reciprocating movement is imparted to the plate 183 and parts carried thereby by means of a link 190 which is pivotally connected at one end to the bottom of the plate 183 and at its other end to the upper end of a lever 191. The lever 191 is pivotally mounted, as indicated at 192, on a bracket 193 which is carried by the base 50. The lever 191 is adapted to be rocked on its pivot so as to impart reciprocation to the link 190 and sewing mechanism by cam mechanism which includes a pair of cams 194 and 195. Both of these cams are keyed to the shaft 93 so as to be rotated thereby, and operate respectively on rollers 196 and 197 which are carried by a rock arm 198. The rock arm 198 is pivotally mounted, as shown at 199, and at its upper or free end is connected by means of a link 200 to the lever 191. The cams 194 and 195 are so shaped that the rock arm 198 will be positively rocked back and forth so as to effect reciprocation of the sewing machine crosswise of the strips of material when the latter are stationary between steps of advancement.

The mechanism of the sewing machine, that is, the reciprocating needle bar 201 which carries the sewing needle 202 and other operating parts, is driven through the agency of the main power shaft 203 of the sewing machine proper. The main power shaft 203 is adapted to be rotated selectively at high or low speed, low speed and high speed pulleys 204 and 205, respectively, being provided for that purpose. The pulleys 204 and 205 are respectively driven at low and at high speed through the agency of belts 206 and 207 which extend upwardly and around small and large pulleys 208 and 209 which are carried by a suitable power shaft 210. (See Fig. 1.) The pulleys 204 and 205 (Fig. 21) are adapted to be operatively connected to the sewing-machine power shaft 203 by means of suitable clutch mechanism, shown at 212 and 213, one element of each of which clutches is keyed to a member 214 which constitutes an extension of the shaft 203.

The clutches 212 and 213 are controlled by means of a clutch collar 215 which is provided with oppositely extending arms 216, 216 which are pivotally mounted in the upper ends of arms 217, 217, the latter being secured to a shaft 218 which is journaled in the base 182 which supports the sewing machine head. The arm 217 is provided with an upwardly facing U-shaped portion 219 which fits around a sleeve 220 carried by a rod 221. The sleeve 220 is positioned on the rod 221 between a pair of springs 222 and 223 which are positioned on the rod by means of fixed or adjustable stops on the rod, as clearly shown in Fig. 19. The other end of the rod 221 is pivoted to one arm 224 of a bell crank which is pivotally mounted on a part of a bracket 225, the latter being supported by the sewing-machine base 182. The other arm 226 of the bell crank is pivoted to a rod 227 which is provided with heads 228 and 229 on its opposite ends. The rod 227 is also pivotally supported by means of a pivot arm 230 which serves with the arm 226 of the bell crank to reciprocably support the said rod 227.

As shown in Fig. 19, the clutch-operating mechanism is in neutral position. For actuating the rod 227 and thereby to actuate the clutches 212 and 213, I provide the following mechanism: An arm or lever 231 is pivoted intermediate its ends on a shaft 232 which is supported by suitable bearings. The upper end of the arm 231 is provided with an adjustable striker pin 233 which is adapted to engage the head 228 on the rod 227, and the lower end of the lever 231 is provided with a roller 234 which is adapted to be engaged by a cam 235 carried by a disk 236 which is keyed to the rotating main shaft 93. When the cam 235 engages the roller 234, the lower end of the lever is thrust outwardly and the upper end inwardly so that the striker 233 engages the head 228 and throws the rod 227 to the right, as seen in Fig. 19. Such movement of the rod 227 is transmitted through the bell crank arms 226 and 224 to the clutch control rod 221 which, through the agency of the spring 222 and sleeve 220, will be effective to yieldingly urge the high speed clutch into engagement so that the sewing-machine needle bar and other parts will be accordingly driven.

I prefer to provide positive stopping mechanism for stopping the operation of the sewing mechanism when the end of the line of stitching is reached, and in order that such positive stopping mechanism may operate most effectively, I provide the low speed driving connection above described. For disengaging the high speed drive and engaging the low speed drive, I provide a lever or bell crank 237 which is pivoted on a shaft 238, as shown in Figs. 18 and 19. The shaft 238 may be supported by suitable bearings provided on the adjacent frame part. The lever 237 is provided with an angularly extending arm portion 239 which is provided with a roller 240, which roller is adapted to engage a cam 241 provided on the periphery of a wheel member 242 which is carried by the main shaft 93. The position of the cam 241 on the wheel 242 is such that the roller 240 will be engaged shortly before the line of stitching is completed, so that the last few stitches will be made at a lower speed than the preceding stitches. By an inspection of Fig. 19, it will be seen that when the cam 241 engages the roll 240, the upper end of the lever 237 which is provided with an adjustable striker 243 will be moved inwardly and caused to engage the head 229 on the rod 227, which, through the agency of the bell crank arms 226 and 224, will now be effective to shift the clutch mechanism in the opposite direction through the agency of the spring 223 and sleeve 220.

When the high speed clutch is thrown into operative engagement, it is locked in such position because of the fact that the arm 224 is swung to an over-the-center position where it is stopped by means of a pin or stop 244. The spring 222 will be compressed when the rod 221 is in the position incident to high speed clutch engagement so that the pressure of the spring will yieldingly hold the arm 224 of the bell crank against the said stop 244. When the lever 237 is actuated to disengage the high speed clutch and effect engagement of the low speed clutch, the arm 224 is of course swung upwardly from its locked position and the slow speed clutch engaged, whereby the speed of reciprocation of the sewing machine parts is greatly reduced. The period of engagement of the slow speed clutch is comparatively short and may be controlled by shaping the cam 241 so that the lever 237 will be held in in-position the desired length of time. A spring 245 stretched between the lever 237 and a bracket 246 serves to pull the lever outwardly when permitted to do so by the cam 241.

For positively stopping the operation of the sewing machine mechanism, I provide the power shaft 203 of the sewing machine with a collar 247 which is provided with a stop 248. The stop 248 is adapted to be engaged by the outer end 249 of a spring-pressed plunger 250. The plunger 250 is mounted within a housing 251 which is enlarged at its lower end as shown at 252 to receive a coil spring 253 and a headed pin 254, the shank of which fits inside the coil spring 253. The enlarged end 252 of the housing 251 is pivotally mounted on a sleeve 255 which is carried by a pivot pin 256, the latter being mounted in suitable bearings provided for that purpose in the sewing-machine base 182.

For controlling the stop plunger 249, I provide a rod 257 which is slidably or reciprocably mounted in a suitable support, and which pin or rod 257 is provided with a cut-out or notch 258. When the rod 257 is moved to such position that the housing 251 of the stop plunger 249 enters the notch, the end 249 of the plunger will be in position to engage the stop shoulder 248 on the collar 247. Likewise, when the rod 257 is moved so that the cut-out portion 258 is moved from under the housing 251, the same will be swung about its pivot pin 256 so that the outer end 249 of the plunger is elevated out of operative position relative to the stop 248. The spring-pressed plunger arrangement above described is desirable for the reason that it absorbs the shocks incident to quick stopping of the rotating shaft 203 of the sewing machine.

For controlling or reciprocating the stop control rod 257, I provide a lever 259 which is pivoted intermediate its ends on the shaft 232. The upper end of the lever 259 is provided with an adjustable striker 260 which is adapted to engage the adjacent end of the control rod 257, and the lower end of the lever is provided with a roller 261 which is adapted to be engaged by a cam 262 carried by the disk 236. It will readily be understood that when the cam 262 engages the roller 261, the lower end of the lever 259 is thrown outwardly and the upper end inwardly to thereby slide the rod 257 in such a manner that the notch 258 is moved from under the housing of the stop plunger 250 so that the latter is raised to inoperative position relative to the stop 248.

When the line of stitching has been completed, the rod 257 is shifted in the reverse direction so as to lower the stop plunger 250 into position wherein it will be effective to engage the stop 248 and thereby to prevent rotation of the sewing-machine power shaft 203. For effecting such reverse direction movement of the rod 257, I provide a striker 263' adjustably mounted on the upper end of a lever 263 which is pivoted on the shaft 238 and provided with an angularly extending arm having a roller 264 mounted thereon and adapted to engage a cam 265 on the periphery of the wheel 242.

The sewing machine mechanism also includes a presser foot member 270 which is carried by the lower end of a reciprocable short rod 271ª which is rigidly secured to another reciprocable rod 271, both of which are mounted in suitable bearings provided in the sewing machine head. The rod 271ª is yieldingly urged to move downwardly by means of a spring 272 which may be mounted on the upper arm of the sewing machine head in any suitable manner. I provide mechanism for automatically lowering and raising the presser foot at the beginning and end of the stitching operation. This mechanism includes a lever 273 which is pivoted intermediate its ends, as shown at 274, on a suitable bracket provided for that purpose, one end of the lever 273 being in engagement with the lower side of a pin 275 which projects outwardly from the presser foot rod 271. The other end of the lever 273 is bent or shaped substantially as shown in Fig. 17, and its extreme end 276 is disposed underneath a bar 277. The downward pressure of the spring 272 is of course effective to maintain the end 276 of the lever 273 in engagement with the bottom side of the bar 277.

The bar 277 is notched out, as indicated at 278, to receive the end 276 of the lever 273 at predetermined intervals. It will be apparent that when the end 276 of the lever 273 is permitted to enter the notch 278, the spring 272 will force the presser foot into its down or operative position. The bar 277 is reciprocably mounted in a suitable guide-way 279 which is formed in the bracket part 225, and means are provided for effecting reciprocation of the bar in properly timed relation to actuate the presser foot as desired. The means for reciprocating the bar 277 includes an adjustable striker 280 which is carried by the lever 231 and which abutment is adapted to engage the adjacent end of the bar when the upper end of said lever is moved inwardly, thereby to slide the bar to the right in Fig. 19, so that the end 276 of the lever 273 will be permitted to ride up on the inclined surface part 281 of the notch 278. For returning the bar to its other position, that is, to position in which the end 276 of the lever 273 is out of the notch 278 and the presser foot held in up position, I provide a lever 282 which is pivoted on the shaft 238 and provided with an adjustable striker 283 which is adapted to engage the adjacent end of the bar 277. The lever 282 is provided with an angularly projecting arm having a roller 284 adapted to engage a cam 285 provided on the periphery of the wheel 242. It will be apparent that when the cam 285 engages the roller 284, the upper end of the lever 282 will be moved inwardly and the striker 283 caused to engage the adjacent end of the bar 277 so as to move the same to the position shown in Fig. 19.

The cycle of operation of the above described sewing machine elements or controlling members is as follows: The lever 259 is first actuated to shift the stop control rod 257 so as to move the stop plunger 249 out of operative engagement with the stop 248 of the sewing machine drive shaft 203. Then the lever 231 carrying the strikers 233 and 280 is actuated to effect lowering of the presser foot 270 and to effect engagement of the high speed driving clutch 213. The cams 194 and 195 are then effective to move the sewing machine crosswise of the length of the strips, during which movement the sewing machine is effective to stitch the superposed strips together. When the line of stitching is almost completed, the lever 237 is actuated to effect disengagement of the high speed clutch and to effect engagement of the low speed clutch. The movement of the lever 237 is very closely followed by movement of the lever 263 which is effective to shift the stop control rod 257 into position permitting the stop plunger housing 251 to enter the notch in the rod whereby the plunger is lowered into position for engaging the stop 248 on the sewing-machine power shaft 203. Substantially simultaneously with the movement of the lever 263, the lever 282 is actuated to move the bar 277 in the direction for effecting raising of the presser foot 270. The line of stitching is then complete and the cam mechanism 194 and 195 is operative to return the sewing machine to its initial position shown in Figs. 17 and 18, after which the above-described cycle of operation is repeated after the strips of material are advanced another step.

*The mechanism for causing the starting end of the sewing thread to project from the bottom side of the strips*

The sewing mechanism is best shown in Figs. 29 to 45 inclusive. This mechanism is of the chain-stitch type and includes a looper 300 which is secured to the outer end of a shaft 301, the latter being mounted in the lower arm 181 of the sewing machine head and oscillated and reciprocated therein by suitable mechanism well known in the art and therefore not herein shown or described. The needle 202 and looper 300 cooperate in a well known manner to effect the chain type stitching which is shown in detail in Fig. 45. This type of stitching consists of loops 302 which are disposed against the bottom of the sewed material, parts 303 and 304 which extend through the pieces sewed together, and single thread portions 305 which are disposed on the top or outside of the said pieces and which connect the parts 304 and 303 as clearly shown. Partly because of the more pleasing appearance of the line of single thread portions 305 over the appearance of the line of looped portions 302, it is preferable to use the top of the sewed-together pieces for the outside of the article of which the sewed-together pieces form a part. When this top side is exposed to view, it is, of course, desirable to remove the starting end of the thread, which, in the case of the usual chain-stitch sewing mechanism, projects from such top side. As above noted, removal of such starting ends requires considerable labor and involves considerable expense, both for the cost of labor and for damaged goods which are incident to the hand method of cutting away the said starting ends. I successfully overcome the disadvantages of the manual method of removing the starting ends by providing mechanism for catching the first loop as it is formed on the loop bar, and, in effect, stealing the loop away from the loop bar so that the first stitch is not completed. The means for catching the first-formed loop is such that it is effective to pull the starting end of the thread through the piece sewed, thereby causing such starting end to project from the bottom side of the sewed pieces.

The loop-catching mechanism consists of a hook member 306 which is oscillatably mounted on a stub shaft 307 carried by the arm 181 of the sewing machine. The hook 306 is so mounted on the shaft 307 through the agency of an arm 308 which is provided with a bearing aperture 309 fitting over the said stub shaft. The outer end of the arm 308 is provided with a portion 310 which is shaped to receive an adjustable end piece 311 to which the hook 306 is adjustably secured. The end piece 311 is adjustably mounted on the end 310 of the arm 308 by means of a screw 312 which constitutes a pivot about which the end piece 311 may be swung. A locking screw 313 serves to lock the end piece 311 in the desired position of adjustment, and an adjusting nut 314, having an eccentrically bored collar portion 315 which fits in the aperture 316 of the end piece, serves to adjust the end piece as desired. The hook 306 is similarly adjustably mounted on the end of the end piece 311 by means of a pivot screw 317, an adjusting nut 318 and a locking screw 319. It will be understood that the outer end of the hook 306 is adjustable laterally with respect to the position of the needle 202 and looper 300, and also radially with respect to the axis of the oscillating shaft 301.

The arm 308 is provided with a pair of laterally projecting spaced ear portions 320 and 321, between which a lever 322 is pivotally mounted intermediate its ends. The upper end of the lever is preferably bent over as shown at 323 to provide a surface adapted to be engaged by a cam 324 which is carried by the said oscillating and reciprocating shaft 301. A spring 325 which is stretched between the lower end of the lever 322 and a pin carried by the arm 308 serves to normally swing the upper or bent end of the lever 322 outwardly out of alignment with the cam 324, as shown in Fig. 31. The lever 308 is also provided with a projecting lug 326 which is connected by means of a tension spring 327 to a pin 328, which pin is supported in fixed position by means of an arm which is secured to and depends from the arm 181 of the sewing-machine head. The spring 327 yieldingly retains the arm 323 and hook 306 in up or inoperative position, as shown in Figure 29. The arm 308 is also provided with a laterally extending lug 329 which receives an adjustable stop screw 330, the latter being adapted to engage a stop pin 331 which is carried by the sewing machine arm 181.

When the hook 306 is held in inoperative position, as above explained, the sewing mechanism, including the needle and loop bar, is operative in the usual manner to produce the above-described chain type of stitching. The hook device is actuated only when the first loop of stitching is formed, with the result of preventing the completion of the first stitch and of pulling the starting end of the thread through the pieces sewed together so that the starting end projects from the bottom side of the said pieces, all as shown in Fig. 45.

The mechanism for effecting operation of the hook device 306 is as follows: A spring-pressed plunger 332 is mounted on a bracket 333 which is supported by means of the main frame member 184. The spring-pressed plunger 332 is positioned on the bracket 333 so that it will be effective to engage the lower end of the lever 322 when the sewing-machine head is fully retracted, that is, returned to its initial position. By an inspection of Figs. 31, 32 and 34, it will be understood that when the lower end of the lever 322 is so engaged, the upper or bent end 323 of the lever will be swung against the tension of the spring 325 into alignment with the cam 324. Then when the sewing-machine mechanism is actuated to stitch the strips together, the cam 324 on the first oscillation of the shaft 301 and looper 300 will engage the bent end 323 of the lever 322 and thereby rock the arm 308 on its pivot. When the arm 308 is thus rocked, the hook 306 is swung outwardly. The hook is so adjusted relative to the looper 300 that when the hook is moved outwardly, the hook end 334 will catch one side of the loop formed about the looper in the manner shown in Figs. 30 and 34. The loop formed in the thread is thus pulled out of normal position, so that when the needle is lowered the second time it will not pass through the loop and hence the first stitch is not completed. A guide piece 344 is provided for guiding the hook in its movement.

The hook 306 is temporarily maintained in out position, as shown in Figs. 30 and 34, by means of a dog 335, which is pivoted as shown at 336 and which is adapted to hook over a finger part 343 of the arm 308. The dog 335 is pivoted for movement between a spring-pressed plunger 338 carried by the bracket 337 and an adjusting or limiting screw 339 also carried by the said bracket, the said bracket being mounted on the frame bracket 333.

As clearly shown in Figs. 30 and 34, the finger 343 of the lever 308 will ride over the inclined upper end portion of the dog, forcing the spring-pressed plunger 338 rearwardly, until the finger 343 reaches a position in which the dog 335 is caused to snap over the outer end of the finger by the said spring-pressed plunger. The dog 335 is elongated, as clearly shown in Figs. 31 to 33 inclusive, so that the arm 308 and hook 306 are retained in their out position for a predetermined length of time during which the sewing machine head is moving crosswise of the length of the strips in the operation of stitching the same together. Because of the fact that the hook 306 is moved transversely with the sewing-machine head, it will be understood that the hook will pull the loop caught thereby through the fabric through which it passes until the starting end of the thread is pulled completely through the fabric and projects from the bottom side thereof, as shown in Fig. 45.

In Figs. 43 and 44, I have diagrammatically illustrated the above-described operation. As shown in Fig. 43, the needle 202 has made its first descent through the edge of the ticking material strip 51ª. The looper 300 is shown in initial position for forming the loop in the usual manner, and the hook 306 is in its initial position. As shown in Fig. 44, a plurality of stitches have been completed, the sewing machine having been moved part of the way across the width of the strips. The looper 300 is shown in a secondary position wherein it is holding a loop 302 of the thread in position for permitting the needle 202 to pass therethrough on its next stroke, and the hook 306 is shown in its out position, as in Figs. 30 and 34. It will be readily understood from an inspection of Fig. 44 that as the hook 306 is carried with the sewing-machine head across the width of the strips, the starting end portion 340 of the thread will be pulled through the edge of the strip of ticking until the entire starting end portion projects from the bottom side of the strip, the loop being incidentally drawn out as shown in Fig. 45.

The extent of crosswise movement of the sewing-machine mechanism is preferably such that a plurality of stitches will be formed on the outer edge of the strip of ticking in the manner shown in Fig. 45. The extra stitches indicated at 341 constitute what may be termed the chaining-off process and serve to prevent the line of stitching from being pulled out. When the reciprocating needle is stopped at the end of the line of stitching, i. e., at the completion of the chaining-off process, the thread is drawn tight over the looper 300 and breaks somewhere in the portion about the looper 300, often at the lower edge of the looper about which the thread forms a fairly sharp bend. The result is that the finishing end 342 of the thread projects downwardly through a loop so that if the said end is pulled, the effect will be to tie a knot in the thread and thereby to effectively prevent unravelling or pulling out of the line of stitching.

In Figs. 40, 41 and 42, I have illustrated the structure of the mattress boxing side portions which are produced by my improved quilting machine. It will be seen that the three strips of material are stitched together along parallel substantially equally spaced lines of stitching which extend crosswise of the lengths of the strips and that the padding strip and lining strip are disposed substantially centrally of the ticking strip. The three strips are thus securely held together in a manner which facilitates use of the strips in mattress boxing construction.

I am aware that although the various features herein described have been disclosed as parts of a quilting machine particularly adapted for the making of border strips, i. e., side portions, for mattress boxings, such features may be changed to suit other requirements and arranged in other combinations to produce other articles without departing from the spirit of the invention, the scope of which should be determined by reference to the following claims, the same being construed as broadly as possible, consistent with the state of the art.

I claim as my invention:

1. In combination, a support for a padding supply strip, a support for a ticking supply strip, a pair of spaced means for intermittently advancing said ticking supply strip, one of said means being also operative to advance said padding strip and the other being operative to limit the extent of advancement imparted to the ticking strip, means for guiding and assembling said ticking and padding strips into relatively superposed relation, sewing mechanism, means operative intermediate steps of advancement of said strips for reciprocating said sewing mechanism crosswise of said superposed strips, thereby to stitch said strips together along spaced, substantially parallel lines of stitching extending crosswise of said strips.

2. In combination, a support for a padding supply strip, a support for a ticking supply strip, a pair of spaced means for intermittently advancing said ticking supply strip, one of said means being also operative to advance said padding strip, and the other being operative to limit the extent of advancement imparted to the ticking strip, means for guiding and assembling said ticking and padding strips into relatively superposed relation, sewing mechanism, means operative intermediate steps of advancement of said strips for reciprocating said sewing mechanism crosswise of said superposed strips, thereby to stitch said strips together along spaced, substantially parallel lines of stitching extending crosswise of said strips, and means for compressing said strips adjacent the path of travel of the needle of said sewing machine.

3. In a machine of the class described, the combination of means for supporting supply rolls of strip material to be sewed together, means for feeding said strips forwardly from said rolls step by step into relatively superposed relation, sewing mechanism and means for reciprocating said sewing mechanism crosswise of said strips in termediate steps of advancement of the latter, thereby to stitch said strips together.

4. In a machine of the class described, the combination of supports for a pair of supply rolls of strip material to be sewed together, a guide for directing said strips into relatively superposed relation, means for effecting step-by-step advancement of said superposed strips, and sewing mechanism disposed intermediate said advancing means and supply rolls for sewing said superposed strips together along a line extending crosswise of said strips.

5. In a machine of the class described, the combination of supports for supply rolls of strip material to be sewed together, means for feeding said strips forwardly from said supply rolls step by step, means for guiding said strips into relatively superposed relation to each other, sewing mechanism located intermediate said feeding and guiding means for stitching said strips together along lines extending crosswise of said strips, and means for receiving and winding said sewed-together strips into a roll.

6. In a machine of the class described, the combination of supports for rolls of strip material to be sewed together, means for guiding said strips into relatively superposed relation, a pulling device having jaws for gripping said strips, means for reciprocating said pulling device whereby the latter is operative to effect advancement of said strips step by step, and sewing mechanism disposed intermediate said pulling device and said supply rolls for stitching said strips together along a line extending crosswise of said strips.

7. In a machine of the class described, the combination of means for supporting supply rolls of strip material to be sewed together, means for guiding said strips into superposed relation to each other, a pulling device having jaws adapted to grip said superposed strips, means for effecting movement of said pulling device when said strips are gripped therebetween, thereby to advance said strips step by step, sewing mechanism disposed intermediate said pulling device and supply rolls operative to stitch said strips together along a line extending crosswise of said strips, means for clamping said strips together adjacent the line of stitching, thereby to facilitate operation of said sewing mechanism, and means for receiving and winding said sewed-together strips into a roll.

8. In a machine of the class described, the combination of means for supporting supply rolls of strip material to be sewed together, means for guiding said strips into superposed relation to each other, a pulling device having jaws adapted to grip said superposed strips, means for effecting movement of said pulling device when said strips are gripped therebetween, thereby to advance said strips step by step, means disposed intermediate said pulling device and supply rolls for limiting the feeding effect of said pulling device on one of said strips, thereby to cause said pulling device to draw such strip taut, sewing mechanism disposed intermediate said pulling device and supply rolls and operative to stitch said strips together along a line extending crosswise of said strips, means for clamping said strips together adjacent the line of stitching, thereby to facilitate operation of said sewing mechanism, and means for receiving and winding said sewed-together strips into a roll.

9. In a machine of the class described, the combination of means for supporting a pair of supply rolls of strip material to be sewed together, a guide for guiding said strips into relatively superposed relation, a pulling device comprising a pair of relatively movable jaw members, mounted so as to be reciprocable longitudinally of the superposed strips, means for effecting opening and closing of said jaws and also reciprocation of said jaws whereby the latter are effective to grip the superposed strips and to pull the same forwardly step by step, means disposed intermediate said pulling device and said supply rolls for limiting the length of said step-by-step advancement of one of said strips, the length of advancement permitted by said limiting means being less than the length of the reciprocating movement of said pulling device whereby the latter is effective to pull the controlled strip taut intermediate said limiting means and pulling device, and sewing mechanism disposed intermediate said pulling device and limiting means for stitching said superposed strips together.

10. In a machine of the class described, the combination of supports for rolls of ticking, lining and padding material strips, guide means for directing said strips into relatively superposed relation, a pulling device for simultaneously advancing said ticking, lining and padding strips comprising a pair of jaws mounted so as to be movable relative to each other into open or closed position, and also so as to be reciprocable longitudinally of the superposed strips, means for effecting opening and closing of said jaws and reciprocation thereof in unison with each other whereby said jaws are operative to grip and pull said strips forwardly step by step, one of said jaws having means for yieldingly engaging the adjacent strip, means disposed intermediate said pulling device and said supply rolls for limiting the length of said step-by-step advancement of said ticking and lining strips, the length of advancement permitted by said limiting means being less than the length of the reciprocating movement of said pulling device whereby the latter is effective to pull the ticking and lining strips taut intermediate said limiting means and pulling device, said yieldingly engaging puller jaw permitting the puller to slip along the strips when the said ticking and lining strips are drawn sufficiently taut, and sewing mechanism disposed intermediate said pulling device and limiting means for stitching said superposed strips together.

11. In a machine of the class described, the combination of means for supporting supply rolls of inner and outer lining material strips and a supply roll of strip padding material, means for guiding said strips forwardly into relatively superposed relation with the strip of padding material interposed between said lining material strips, pulling means for effecting step by step advancement of said strips through said guiding means, said pulling means comprising a pair of relatively movable jaws adapted to be opened and closed and mounted so as to be reciprocable in unison longitudinally of said superposed strips, one of said jaws including a plurality of independent yieldably supported elements adapted to yieldingly engage one of said lining strips when the jaws are in closed or gripping position, said yielding elements being operative to effect substantially uniform gripping of the strip across substantially the entire width thereof, means for effecting opening and closing of said jaws and also reciprocation thereof in unison with each other, said jaws being thereby operative to successively advance said strips step by step, means disposed intermediate said pulling device and said supply rolls for limiting the advancement of said lining strips, the advancement permitted by said limiting means being less than the advancement of said pulling means whereby the latter is effective to pull the lengths of the lining strips intermediate said pulling means and limiting means taut, said yieldingly engaging puller jaw permitting the puller to slip along the strips when said lining strips are drawn sufficiently taut, and sewing mechanism disposed intermediate said pulling and limiting means for successively stitching said strips together along spaced parallel lines extending crosswise of said strips.

12. In a machine of the class described, the combination of a support for a supply roll of a strip of ticking, a support for a supply roll of a strip of padding, means for effecting advancement of said strips step by step, means for guiding said strips into relatively superposed relation, means for spreading said strip of ticking across its width, and means for stitching said superposed strips together along lines extending crosswise of their lengths.

13. In a machine of the class described, the combination of a support for a supply roll of a strip of ticking having hemmed edges, a support for a supply roll of a strip of padding, means for effecting advancement of said strips step by step, means for guiding said strips into relatively superposed relation, means cooperating with said hemmed edges for spreading said strip of ticking across its width, and means for stitching said superposed strips together along lines extending crosswise of their lengths.

14. In a machine of the class described, the combination of a support for a supply roll of a strip of ticking, a support for a supply roll of a strip of padding, means for effecting advancement of said strips step by step, means for guiding said strips into relatively superposed relation, means for stitching said strips together along lines extending crosswise of their lengths, means located adjacent one side of the line of stitching and cooperating with said hemmed edges for spreading the ticking strip crosswise of its length, and means located on the opposite side of said line of stitching for holding said ticking strip in spread condition while the stitching means is actuated.

15. In a machine of the class described, the combination of a support for a supply roll of a strip of ticking having hemmed edges, a support for a supply roll of a strip of padding, means for effecting advancement of said strips step by step, means for guiding said strips into relatively superposed relation, means for stitching said strips together along lines extending crosswise of their lengths, means located adjacent one side of the line of stitching for compressing said strips so as to facilitate operation of said stitching means, means carried by said compressing means and cooperating with said hemmed edges for spreading the ticking strip on one side of the line of stitching, and means also carried by said compressing means for maintaining the ticking strip in spread condition on the opposite side of the line of stitching while said stitching means is actuated.

16. In a machine of the class described, the combination of means for supporting supply rolls of strip material, means for effecting step-by-step advancement of the strips of material from said supply rolls, means for limiting the lengths of material advanced in each step of advancement, sewing mechanism adapted to be reciprocated crosswise of said strips for stitching the same together, a main frame for supporting said parts, a shaft rotatably mounted on said frame, and a plurality of cams carried by said shaft for respectively actuating said parts, a reel for receiving and rolling said sewed-together strips into a roll, and means connecting said reel with said main shaft for effecting rotation of the reel.

17. In a machine of the class described, the combination of means for assembling and advancing in relatively superposed relation, a padding strip and a ticking strip having hemmed edges, outwardly facing guides adapted to engage between the ticking strip and the folds of the hemmed edges thereof for transversely spreading the strip, and sewing mechanism for stitching said strips together in said relation.

JOHN F. GAIL.